(12) United States Patent
Guggilla et al.

(10) Patent No.: US 11,366,798 B2
(45) Date of Patent: Jun. 21, 2022

(54) INTELLIGENT RECORD GENERATION

(71) Applicant: ACCENTURE GLOBAL SOLUTIONS LIMITED, Dublin (IE)

(72) Inventors: Chinnappa Guggilla, Bangalore (IN); Praneeth Medhatithi Shishtla, Bangalore (IN); Madhura Shivaram, Bangalore (IN); Harinarayan Ojha, Dewas (IN); Anirudh Murthy, Chennai (IN); Sumeet Sawarkar, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 156 days.

(21) Appl. No.: 16/883,472

(22) Filed: May 26, 2020

(65) Prior Publication Data
US 2021/0319007 A1 Oct. 14, 2021

(30) Foreign Application Priority Data
Apr. 14, 2020 (IN) .............................. 202011016053

(51) Int. Cl.
*G06F 16/23* (2019.01)
*G06N 20/00* (2019.01)

(52) U.S. Cl.
CPC ............. *G06F 16/23* (2019.01); *G06N 20/00* (2019.01)

(58) Field of Classification Search
None
See application file for complete search history.

(56) References Cited

U.S. PATENT DOCUMENTS

| 2004/0014479 A1 | 1/2004 | Milman |
| 2017/0091664 A1 | 3/2017 | Sanchez et al. |
| 2018/0241881 A1 | 8/2018 | Li et al. |
| 2019/0122766 A1 * | 4/2019 | Strader ............... G06F 16/3344 |

* cited by examiner

*Primary Examiner* — Scott A. Waldron
(74) *Attorney, Agent, or Firm* — Mannava & Kang, P.C.

(57) ABSTRACT

Examples of a record generation system are provided. The system may receive a record generation requirement from a user. The system may obtain record data, a plurality of user documents, and identify a record corpus from the record data. The system may sort the record data into a plurality of data domains. The system may determine at least one record mapping context including a record value from the plurality of user documents. The system may determine a selection rule from the plurality of data domains for each of the record mapping context. The system may create a record index corresponding to the plurality of user documents. The system may create a record generation model corresponding to the record generation requirement based on the record index. The system may generate a record generation result corresponding to the record generation requirement comprising the relevant record generation model.

20 Claims, 20 Drawing Sheets

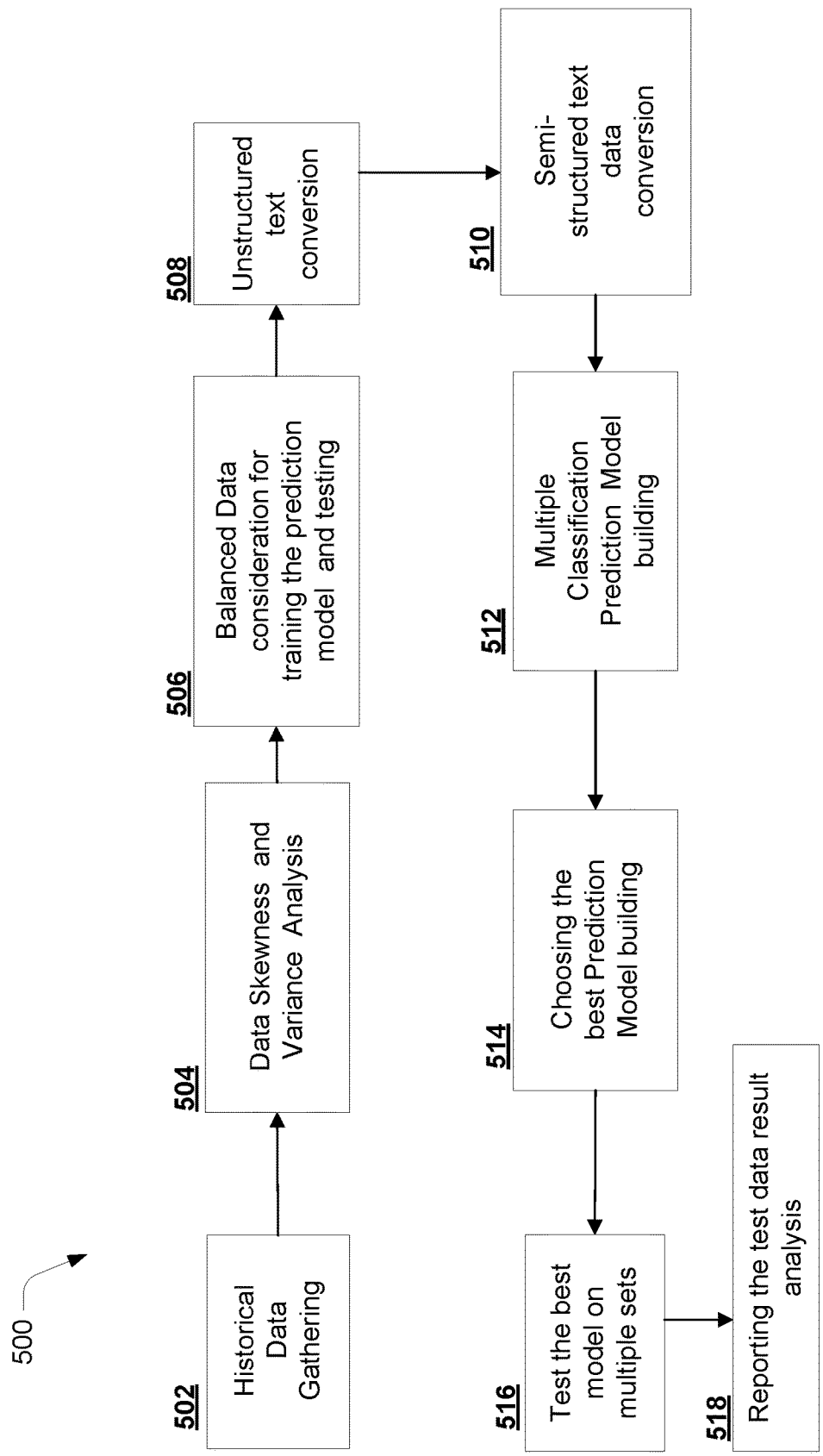

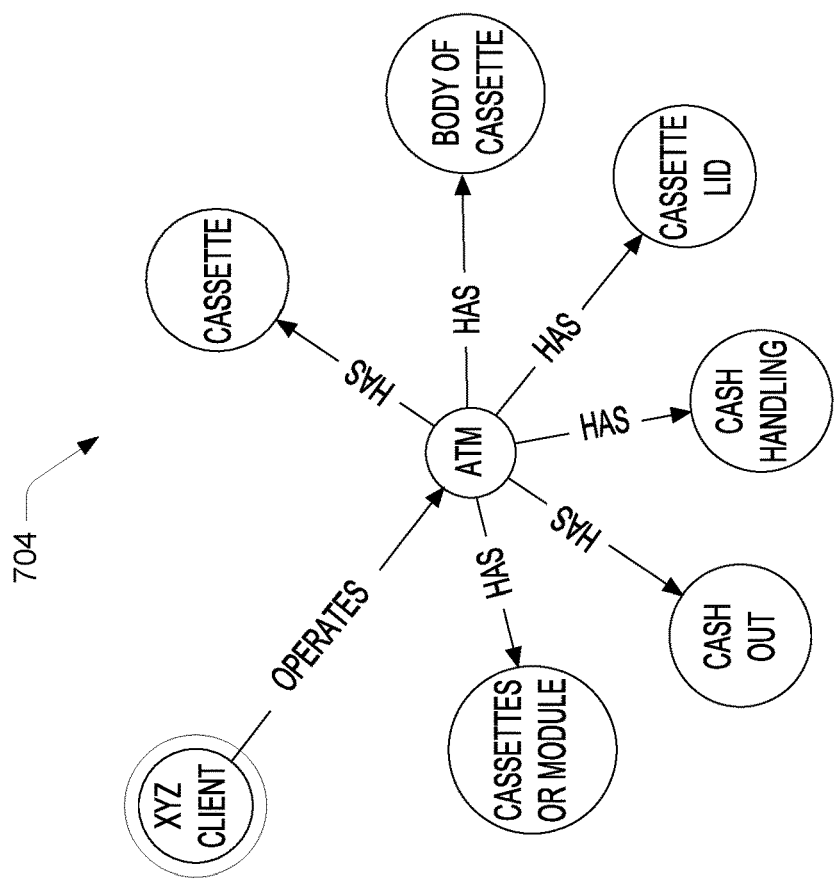
*FIG. 7A*
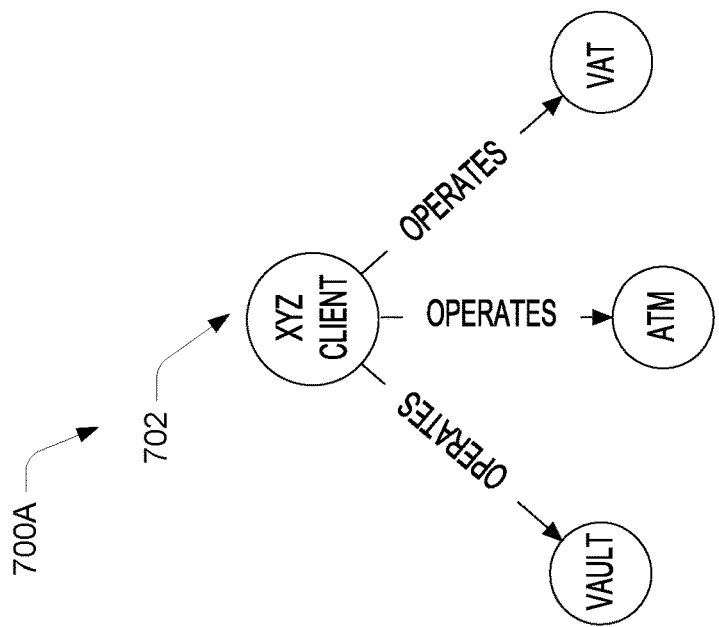

| Device - ATM | Covered FL | Covered SL | Out of Scope | Per Item Charge $ | Standard Hour Rate | Overtime Rate | Sundays & Holidays Rate | COMMENTS |
|---|---|---|---|---|---|---|---|---|
| God acts | | | x | | | | | quote required to email to XYZ Bank no approval needed if it is $1,000 or under |
| contract- cash handling | | | x | | | | | No, not billable covered under XYZOS |
| Replenishment - Cash handling | | | x | | | | | No, not billable covered under XYZOS |
| cash out - sole diagnosis | | x | | | | | | No, not billable covered under XYZOS |
| casette - body replacement | x | | | | | | | |
| lid replacement casette | x | | | | | | | |
| repair of casette | x | | | | | | | |
| Casette replacement | | x | | | | | | |
| Fraud calls | | | x | | | | | |

FIG. 9

| Client | Device | Components |
|---|---|---|
| XYZ Client | atm | Cash Emergency Replenishment |
| XYZ Client | atm | Contract for Cash Handling |
| XYZ Client | atm | Cash Out |
| XYZ Client | atm | Cassette Lid |
| XYZ Client | atm | Coin issues |
| XYZ Client | atm | Communication Failure |
| XYZ Client | atm | Consumables |
| XYZ Client | atm | Testing Carsd |
| XYZ Client | atm | Labor |
| XYZ Client | atm | Modem |
| XYZ Client | atm | Request for reset |
| XYZ Client | atm | Software Reload |
| XYZ Client | atm | Standby |
| XYZ Client | atm | Surge protection |
| XYZ Client | atm | jammed bills |

FIG. 10

INTELLIGENT RECORD GENERATION

PRIORITY

The present application claims priority under 35 U.S.C. 119(a)-(d) to Indian Non-Provisional Patent Application number 202011016053, having a filing date of Apr. 14, 2020, the disclosure of which is hereby incorporated by reference in its entirety.

BACKGROUND

In the manufacturing industry, once technical products such as computers and machinery are supplied to customers, customers expect solutions to various technical and software problems related to the supplied products. In situations where the products may be installed in remote locations, the supplier organization may have to send trained experts to troubleshoot and resolve the problems raised in the supplied products. Presently, various organizations often deployed dedicated support personnel for the generation of problem requests, for problem mitigation, resource allocation, and for generating an invoice for problem mitigation, if applicable.

In various situations, the problem statements may be generated automatically from the customers; however, such problem statements may be noisy. For example, these statements may include incomplete sentences, broken phrases, or codified language. Generally, these problem expressions may be related to repair, installation, and replacement of the product, but the terminology in these statements may drastically vary based on a type of problem, a type of component, and a type of product. Additionally, there may be numerous products, components, and associated customers, yielding a multitude of technical problem statements over a period of time.

The support personnel from the supplier organization often face the challenge of interpreting these problem statements. Presently, a team of trained professionals at the supplier organization may manually interpret the problem request, identify the billable services and components of the products, and thus determine the billable amount. Additionally, various customers may use billing contracts on particular services and part names for estimating the billing amount on the services provided by the technician. In various instances, the inflow of requests per day may be in the thousands and, therefore, the trained professionals may take more time and may spend a lot of time understanding the problem. Furthermore, the billing amount may be prone to errors. This may lead to revenue loss for the supplier organization. Currently, available systems do not read the problem requests and billing contract plan documents and, instead, may directly compute the billing amount from pre-determined prices for a service request and associated parts associated with the service request. Furthermore, the presently available systems may not be intelligent, may be incapable of learning from historical data, and also may not be scalable.

Accordingly, a technical problem with the currently available systems for process optimization is that they may be inefficient, inaccurate, and/or not scalable. There is a requirement for a semi-automatic intelligent billing service that leverages advanced Artificial Intelligence (AI) techniques to alleviate the aforementioned problems. There is a need for a record generation system that may account for the various factors mentioned above, amongst others, to generate an invoice efficiently and cost-effectively.

BRIEF DESCRIPTION OF DRAWINGS

FIG. 5 illustrates a process flow diagram for record identification and generation using a record generation system, according to an example embodiment of the present disclosure.

FIG. 7A illustrates a pictorial representation of a product knowledge graph and a services knowledge graph created by a record generation system, according to an example embodiment of the present disclosure.

FIG. 9 illustrates a pictorial representation of a part of an exemplary data comprising information on various services and products used for a record generation process by a record generation system, according to an example embodiment of the present disclosure.

FIG. 10 illustrates a pictorial representation of a plurality of data domains used for a record generation process by a record generation system, according to an example embodiment of the present disclosure.

DETAILED DESCRIPTION

Figure 1:
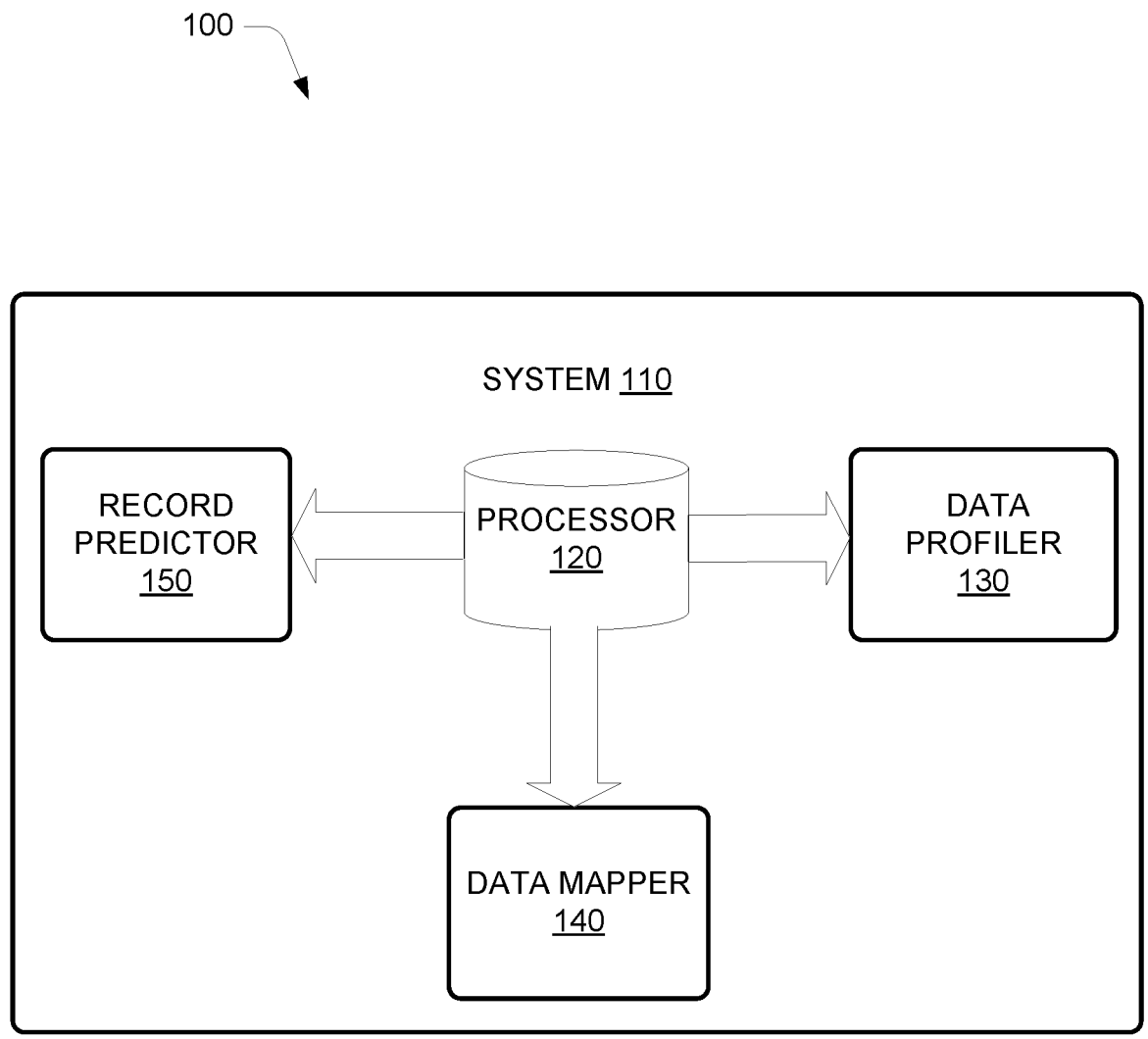
FIG. 1 illustrates a diagram for a record generation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods invoice record generation including a Record Generation System (RGS). The record generation system (referred to as "system" hereinafter) may be a system for understanding a problem expression related to a product or a service offered by an organization, identifying billable and non-billable components, and accurately estimating the billing amount on billable components and services. The system may generate documents related to various products, product components, and services. For the purpose of this disclosure, the term 'document' may refer to an invoice for a product, a product component, and/or a service provided by an organization to a client. Additionally, the system may assist a human agent by providing a summary of the learned knowledge as a graphical representation by leveraging various Natural Language Processing (NLP), Machine Learning (ML) and Deep Learning (DL) techniques. The graphical representation may be used for efficiently making decisions related to complex problems in the process of product technical service life cycle.

The system may include a processor, a data profiler, a data mapper, a record predictor. The processor may be coupled to the data profiler, the data mapper, and the record predictor. The data profiler may receive a query from a user. The query may indicate a record generation requirement. The data profiler may obtain record data and a plurality of user documents associated with the query from a plurality of data sources. The data profiler may implement an artificial intelligence component to identify a record corpus from the record data. The record corpus may include a plurality of words associated with the record generation requirement. The data profiler may implement an artificial intelligence component to sort the record data into a plurality of data domains based on mapping the plurality of words with the plurality of user documents. Each of the plurality of data domains may comprise a data value associated with the record generation requirement.

The data mapper may implement a first cognitive learning operation to determine at least one record mapping context associated with record generation requirement from the plurality of user documents. The mapping context may include a record value from the plurality of user documents. The data mapper may implement a first cognitive learning operation to determine a selection rule from the plurality of data domains for each of the record mapping context associated with the record generation requirement.

The record predictor may implement a second cognitive learning operation to create a record index corresponding to the plurality of user documents based on the application of the selection rule on the plurality of user documents. The record predictor may implement a second cognitive learning operation to create a record generation model corresponding to the record generation requirement based on the record index. The record generation model may comprise the data value from the plurality of data domains associated with the record value from the record mapping context based on the selection rule. The record predictor may implement a second cognitive learning operation to generate a record generation result corresponding to the record generation requirement. The record generation result may comprise the record generation model relevant for the resolution to the query. The record predictor may implement a second cognitive learning operation to perform a record generation action to address the record generation requirement, based on the record generation result.

The embodiments for the record generation requirement presented herein are exemplary in nature and should be treated as such. For the sake of brevity and technical clarity, the description of the record generation system may be restricted to a few exemplary embodiments; however, to a person of ordinary skill in the art, it should be clear that the system may be used for the fulfillment of various record generation requirements other than those mentioned hereinafter.

Accordingly, the present disclosure aims to provide a record generation system that may account for the various factors mentioned above, amongst others, to create invoice records in an efficient, and cost-effective manner. Furthermore, the present disclosure may categorically analyze various parameters that may have an impact on identifying billable and non-billable components of a product or a service, accurately estimating the billing amounts on billable components of a product or a service in a personalized manner for various clients of an organization in an efficient and effective manner.

FIG. 1 illustrates a system 110 for record generation (referred to as system 110 hereinafter), according to an example implementation of the present disclosure. In an example, the system 110 may include a processor 120. The processor 120 may be coupled to the data profiler 130, the data mapper 140, and the record predictor 150.

The data profiler 130 may receive a query from a user. The query may indicate a record generation requirement. The record generation requirement may be relevant for the generation of invoice records (also referred to as "invoice" hereinafter) pertaining to various products, product components (also referred to as "components" hereinafter) and services offered by an organization. In accordance with various embodiments of the present disclosure, the record generation requirement may be relevant to the generation of records pertaining to various products and services offered by an organization. The record generation requirement may be relevant to the intelligent and optimal matching of various client bill contract documents with various rules pertaining to invoicing various products and services for generating an invoice for a particular product or a service for a particular customer. The record generation requirement may be relevant to the identification of various revenue leakage avenues that may be created as a consequence of an invoice generation process. The record generation requirement may be relevant to the minimization of various revenue leakage avenues that may be created as a consequence of the invoice generation process. The record generation requirement may be relevant to minimizing the human effort required for invoice generation. In an example, the human effort may be minimized by limiting the number of requests that may require additional review for validating the billing decision. The number of requests may be limited by identifying missing information from the technician notes through the intelligent and optimal matching of various client bill contract documents with various rules pertaining to invoicing various products and services for generating an invoice for a particular product or a service for a particular customer. The record generation requirement may be relevant for recommending the most appropriate billing components and services to enable better decision making regarding invoice record generation. The record generation requirement may be relevant to creating a product knowledge database by using various Artificial Intelligence (AI) methods and comprising comprehensive information above various products, components, and services associated with an organization. The record generation requirement may include leveraging the product knowledge base for both problem resolution and problem understanding by using advanced Artificial Intelligence (AI) methods. In an example, the record generation requirement may be associated with at least one of a process, an organization, and an industry-relevant for data assessment for invoice record generation operations. The record generation requirement may be related to generating key insights and data related to the generation of various invoices and records pertaining to various products, services, and components offered by an organization. The embodiments for the record generation requirement presented herein may be exemplary in nature and a person skilled in the art must understand that the record generation requirement may include generation of various records not mentioned herein.

The data profiler 130 may obtain record data and a plurality of user documents associated with the query from a plurality of data sources. The record data may be data may include the names of various products, components, and services. The record data may include information related to invoice amounts for various products, components, and services. The record data may include geographical locations for various customers and various offices of an organization. The record data may include various contract plans, which may be customized for a client. The record data may include various service notes received from a technician pertaining to client concerns regarding various products, components, and services. The record data may include various conversations and communication that may be received from a client regarding various products, components, and services. The record data may include information related to technical expertise requirements for resolving concerns related to various products, components, and services. The record data may include information related to time duration, for example, the number of hours, for resolving concerns related to various products, components, and services. The record data may include information related to various products, components, and services, various clients, client invoice plans, client subscription plans, client payment plans, client requirements, technical expertise, required time duration associated with various products, components, and services. In accordance with various embodiments of the present disclosure, the record data may include data generated from processing historical record generation requirements.

The plurality of user documents may include various documents pertaining to concerns related to various products, components, and services. The plurality of user documents may include entitlement descriptions such as client invoice plans, client subscriptions, and the like. The plurality of user documents client concern description, problem expression, and the like. In accordance with various embodiments of the present disclosure, the plurality of user documents may be received by the system 110 from a user. In an example, the plurality of user documents may be stored in the system 110. The plurality of data sources may include various databases maintained by an organization. In an example, the plurality of data sources may include various databases that may be subscribed by an organization. In accordance with various embodiments of the present disclosure, the data profiler 130 may obtain the record data from multiple data sources amongst the plurality of data sources for resolving the query. In an example, the data profiler 130 may obtain the plurality of user documents and the record data from different data sources amongst the plurality of data sources for resolving the query.

The data profiler 130 may implement an artificial intelligence component to identify a record corpus from the record data. The record corpus may be an annotated collection of written texts, service notes, invoice plans, invoice generation rules, client information such as client address, client invoice plans, and the like from the record data. The record corpus may include an organized collation of the record data. The artificial intelligence component may comprise the implementation of an algorithm that may include an intelligent machine learning module that may help in analyzing, extracting and classifying information from the record data and help in building the record corpus. The implementation of NLP techniques may a continuous process and may enrich the record corpus. The data profiler 130 may implement the artificial intelligence component on a result from historical record generation requirements and update the same in the record corpus. In accordance with various embodiments of the present disclosure, the data profiler 130 may obtain the record data on a near real-time basis from the plurality of data sources. The data profiler 130 may implement the artificial intelligence component on the record data obtained on a near real-time basis for creating the record corpus. The artificial intelligence component may provide comprehension of the record data in the form of the record corpus.

The record corpus may include a plurality of words associated with the record generation requirement. The plurality of words may include a list of words that may be comprised within the record corpus. The plurality of words may be various words associated with written texts, service notes, invoice plans, invoice generation rules, client information such as client address, client invoice plans, and the like from the record data. The plurality of words may include words associated with information related to various products, components, and services, various clients, client invoice plans, client subscription plans, client payment plans, client requirements, technical expertise, required time duration associated with various products, components, and services, and the like. The plurality of words may include all the words included in the record corpus. In accordance with various embodiments of the present disclosure, the plurality of words may include an annotation associated with any of the words on the record corpus.

The data profiler 130 may implement the artificial intelligence component to sort the record data into a plurality of data domains based on mapping the plurality of words with the plurality of user documents. In accordance with various embodiments of the present disclosure, the data profiler 130 may deploy various NLP techniques and data mining techniques (explained below) for extracting data from the plurality of user documents. The data profiler 130 may implement various NLP techniques on the record corpus from historical record generation requirements and map the same with a present record generation requirement to create the plurality of data domains. The plurality of data domains may include data mined from the plurality of data sources, such as for example, service notes, various databases, and the like. The plurality of data domains may include data such as for example, knowledge pertaining to various products and services such as component name, service name, part numbers, part order numbers, quantities and billing amounts, client interactions, client geographical locations, client invoice plans, client subscriptions and the like. The plurality of data domains may include the record corpus mapped with the plurality of user documents to identify a similarity, thereby assisting in resolving the query. Each of the plurality of data domains may comprise a data value associated with the record generation requirement. The data value may include data present in any of the data domains from the plurality of data domains. In accordance with various embodiments of the present disclosure, the data profiler 130 may update the record corpus and the plurality of data domains, based on an update in the record data or based on an update in the plurality of user documents. For example, if a new service may be launched by an organization, the record data may be updated for the same. The data profiler 130 may update the record corpus and the plurality of data domains to reflect the update in the record data. In an example, there may be a modification in the plurality of user documents such as for example, request for a new service, the data profiler 130 may update the record corpus and the plurality of data domains to reflect the update in the plurality of user documents.

The artificial intelligence component may include the implementation of various natural language processing (NLP) techniques such as data parsing, data annotation, data crawling and the like for processing the record data to generate the record corpus, identification of the plurality of words and generation of the plurality of data domains. For the sake of brevity and technical clarity the NLP techniques have not been explained in detail herein, however, the same should be clear to a person skilled in the art. The NLP techniques may include detection and segregation of a problem expression that may be generated by a machine and technician problem resolution notes. In an example, the NLP techniques may include the implementation of algorithms such as Conditional Random Fields (CRFs) bi-directional and attention-based Long short-term memory networks for training and inference. The NLP techniques may identify problem expressions by annotating the boundaries of machine-generated and technician generated problem expressions from record data. The annotation may be done using the record corpus. In accordance with various embodiments of the present disclosure, the artificial intelligence component may include an algorithm for linking record data from historical record generation requirements to a present record generation requirement. The aforementioned linking may be done through identifying a pattern from a current problem expression and capturing the state of the previous problem resolution for similar problem expressions from the record data. The algorithm for linking may be, for example, a customized algorithm based on the similarity of patterns using various NLP and semantic contextual embeddings such as Embeddings from Language Models (ELMo) algorithm, Bidirectional Encoder Representations from Transformers (BERT) algorithm. The ELMo algorithm may enable the data profiler 130 to understand different nuances associated with a word from the record data. The BERT algorithm may enable the data profiler 130 to learn the context of a word from the records data based on the surroundings of the word. In an example, a similar problem expression may refer to problem expression for the same client, problem expressions related to the same product, component, and service, problem expression related to the same client invoice plans, problem expression related to the same geographical location, and the like.

In accordance with various embodiments of the present disclosure, the artificial intelligence component may include the NLP techniques for mining knowledge pertaining to various products, components, and services from the plurality of data sources such as for example, various databases. The artificial intelligence component may create a knowledge mining model using various algorithms such as ELMo, BERT, Zero-shot based learning using KG embeddings and the like. The knowledge may include component name, service name, component numbers, component order numbers, quantities and billing amounts. The plurality of data sources may include various websites across the Internet. The data profiler 130 may crawl the websites for the aforementioned knowledge and may link various product components to corresponding products. In an example, the data profiler 130 may identify a gap in knowledge from the internal databases. The data profiler 130 may fill the gap by crawling for knowledge from various websites across the Internet. The data profiler 130 may mine data from invoice notes and chargeable line items such as component names, services, labor, travel, and the like, phrases using which an organization may perform a billing validation. The artificial intelligence component may deploy the NLP techniques to mine all the part names and services from these textual documents. In an example, the chargeable line items data may not be available then, the data profiler 130 may mine knowledge from invoice notes data if it may be available. The artificial intelligence component may deploy the NLP techniques to compile a list of component names and services from various client contract bill plan matrices if they may be available. The data profiler 130 may aggregate data pertaining to various products, components, and services such as component names and associated services as mentioned above prepare a lookup of component names and services.

The artificial intelligence component may include the NLP techniques for discovering knowledge pertaining to various products, components, and services from service notes. The service notes may be related to the query. In an example, the service notes may be associated with historical record generation requirements. The data profiler 130 may mine knowledge pertaining to various products, components, and services from service notes when the plurality of data sources mentioned above may not be available. In an example, the data profiler 130 may mine knowledge pertaining to various products, components, and services from service notes irrespective of data mining done on other data sources from the plurality of data sources. In accordance with various embodiments of the present disclosure, the data mining from the service notes may be done based on deploying an NLP-based parsing approach to discover component names and services from service notes data.

The artificial intelligence component may include the NLP techniques for mining component numbers, component order numbers, and quantities associated with component names from record data. The data profiler 130 may use component part numbers extracted as part of knowledge extraction as mentioned above. The data profiler 130 may tag each of the component part numbers from the knowledge extracted from various databases. In an example, the data profiler 130 may tag product component order numbers. The tagging may be done using the Regular Expression (RegEx) algorithm. In an example, the tagging may include marking numbers with a marker such as "#". The data profile may determine quantities of component parts for a particular order such as for example, "four (4) Keys" from a number of tagging markers. In an example, the data profiler 130 may directly determine quantities of component parts such as for example, "four (4) Keys" for a particular order from numeric quantities mentioned in the extracted knowledge. The artificial intelligence component may associate the component numbers, order numbers, and quantities with component names as identified above.

The artificial intelligence component may include the NLP techniques for the detection of billing amounts pertaining to various products, components, and services from service notes. The billing amounts may be quoted in the service notes by a technician. The artificial intelligence component may detect the same using the RegEx algorithm. The artificial intelligence component may include the NLP techniques for the amalgamation of mining data. The artificial intelligence component may compile the data extracted from the record data and the plurality of user documents as described above and compiled to create the plurality of data domains. The artificial intelligence component may include the NLP techniques for automatic annotation of service notes with part names, services, part numbers and quantities, and the like. The artificial intelligence component may automatically tag component names, component numbers, orders, quantities and amounts for the sampled training data of service notes. The artificial intelligence component may resolve any discrepancy with the data value from the plurality of data domains while tagging.

The artificial intelligence component may include an equipment and services knowledge extraction engine that may deploy algorithm such as for example, CRF, Bidirectional LSTM, and Zero-shot based learning using Knowledge Graph (KG) embedding. The artificial intelligence component may select appropriate features associated with the plurality of data domains. The features may include measurable parameters associated with the record data. For example, the features may include various products, components, and services, various clients, client invoice plans, client subscription plans, client payment plans, client requirements, technical expertise, required time duration associated with various products, components, and services, and the like. The artificial intelligence component may train the knowledge extraction model (mentioned above) and may learn from the same. The artificial intelligence component may evaluate the accuracy of the extraction model on a separate test data set. The artificial intelligence component may list all the equipment's component names, services, component numbers and quantities that may be extracted using the knowledge extraction model. The record corpus may include the list of all the equipment's component names, services, component numbers and quantities that may be extracted using the knowledge extraction model.

The artificial intelligence component may include the NLP-based parsing approach for identifying negative phrases such as services that may not be performed by a technician and various faults/errors of the equipment. The data profiler 130 may detect and extract negative actions/phrases such as for example, "Keys are not replaced". The data profiler 130 may detect and extract errors/malfunctions of equipment, such as for example, "Button is not working".

The data mapper 140 may implement a first cognitive learning operation to determine at least one record mapping context associated with record generation requirement from the plurality of user documents. The mapping context may include a record value from the plurality of user documents. The record mapping context may be a part of the plurality of user documents that may include various mapping features such as problem statement, client information, client billing contracts, client service subscriptions, client entitlements, and the like. The record value may refer to the data identified as relevant for various mapping features such as problem statement, client information, client billing contracts, client service subscriptions, client entitlements, and the like.

In accordance with various embodiments of the present disclosure, the data mapper 140 may determine the record value to include a plurality of word phrases identified from the plurality of user documents. The plurality of word phrases may include various words, or sentences relevant for various mapping features such as problem statement, client information, client billing contracts, client service subscriptions, client entitlements, and the like.

The data mapper 140 may implement the first cognitive learning operation to determine a selection rule from the plurality of data domains for each of the record mapping context associated with the record generation requirement. As mentioned above, the record corpus may include information related to various products, components, and services, various clients, client invoice plans, client subscription plans, client payment plans, client requirements, technical expertise, required time duration associated with various products, components, and services, and the like. The data mapper 140 may map the plurality of word phrases with the record corpus to determine the selection rule from the plurality of data domains. The data mapper 140 may map the plurality of word phrases from the relevant information from the record corpus to determine the selection rule. The selection rule may refer to a set of selection criteria that may be deployed by the data mapper 140 for mining data relevant for processing the record generation requirement from the plurality of data domains. For example, the data mapper 140 may develop the selection rule for mining invoice information for a particular service related to a particular product for a client with a particular billing contract. The data mapper 140 may develop the selection rule for mining invoice information for a particular service related to a particular product for a client with a particular geographical location. data mapper 140 may develop the selection rule for mining invoice information for a particular service related to a particular product for a client with a particular service subscription. data mapper 140 may develop the selection rule for mining invoice information for a particular service related to a particular product for a client. The data mapper 140 may develop the selection rule for mining invoice information for a particular client for all services requested generated by that particular client.

As mentioned above, the record corpus may include information related to invoice amounts for each of the various products, components, and services, various clients, client invoice plans, client subscription plans, client payment plans, client requirements, technical expertise, required time duration associated with various products, components, and services, and the like. In an example, the data mapper 140 may develop a selection rule for selecting appropriate invoice amounts for the various products, components, and services based on various clients, client invoice plans, client subscription plans, client payment plans, client requirements, technical expertise, required time duration associated with various products, components, and services, and the like. For example, the data mapper 140 may develop a selection rule to categorize various products, components, and services as "non-billable" based on various clients, client invoice plans, client subscription plans, client payment plans, client requirements, technical expertise, required time duration associated with various products, components, and services, and the like. The "non-billable" products, components, and services may be exempt from the accrual of any financial consideration. In an example, the data mapper 140 may develop a selection rule to categorize various products, components, and services as "billable" based on various clients, client invoice plans, client subscription plans, client payment plans, client requirements, technical expertise, required time duration associated with various products, components, and services, and the like. The "billable" products, components, and services may be included for accrual of any financial consideration. In accordance with various embodiments of the present disclosure, the first cognitive learning operation may be implemented to categorize various products, components, and services as "billable" and/or "non-billable" based on various clients, client invoice plans, client subscription plans, client payment plans, client requirements, technical expertise, required time duration associated with various products, components, and services, and the like.

In an example, the data mapper 140 may implement the first cognitive learning operation to update the record corpus based on the plurality of word phrases. For example, the data mapper 140 may identify that various words such as a new service request, a new product description, a new product component description, and a synonymous term related to an existing product, component, or service from the plurality of word phrases may not be included in the record corpus. The data mapper 140 may annotate the plurality of word phrases that may not be included in the record corpus by implementing the first cognitive learning operation. The first cognitive learning operation may include various NLP techniques described above.

The record predictor 150 may implement a second cognitive learning operation to create a record index corresponding to the plurality of user documents based on the application of the selection rule on the plurality of user documents. The record index may include a list of various products, components, and services associated with the plurality of user documents being categorized appropriately into billable and/or non-billable based on client information, client invoice plans, client subscription plans, client payment plans, client requirements, technical expertise, required time duration associated with various products, components, and services, and the like. For example, the record index may include all the billable and all the non-billable products, components, and services that may be associated with the plurality of user documents for a client. The record index may include all the billable and all the non-billable products, components, and services that may be associated with the record generation requirement categorized based on client information, client invoice plans, client subscription plans, client payment plans, client requirements, technical expertise, required time duration associated with various products, components, and services, and the like. In accordance with various embodiments of the present disclosure, record predictor 150 may implement the second cognitive learning operation to predict the billable and the non-billable products, components, and services that may be included in the record index. An exemplary embodiment for implementation of the second cognitive learning operation to predict the billable and the non-billable products, components, and services that may be included in the record index may be illustrated by way of FIG. 5.

The record predictor 150 may implement the second cognitive learning operation to create a record generation model corresponding to the record generation requirement based on the record index. The record generation model may comprise the data value from the plurality of data domains associated with the record value from the record mapping context based on the selection rule. The record generation model may include appropriate invoice amounts for all the billable and non-billable products, components, and services based on client information, client invoice plans, client subscription plans, client payment plans, client requirements, technical expertise, required time duration associated with various products, components, and services, and the like, which may be associated with the plurality of user documents for a client.

In accordance with various embodiments of the present disclosure, the record predictor 150 may create the record generation model as a knowledge tree comprising the data values from the plurality of data domains distributed across the knowledge tree based on the mapping context and the selection rule. The knowledge tree may be a decision tree-based representation of the record generation model, wherein various products, components, and services may be arranged in a decision tree format comprising a plurality of nodes (explained in detail by way of subsequent FIGS.). In accordance with various embodiments of the present disclosure, each of the plurality of nodes may represent a product, a component, a service, a client, a client invoice plan, a client subscription plan, a client payment plan, a client requirement, technical expertise, required time duration associated with various products, components, and services. In an example, the knowledge tree may be constructed such that to include products, components, and services associated with the products, the components, and the services relevant to the record generation requirement (explained in detail by way of subsequent FIGS.).

The record predictor 150 may implement the second cognitive learning operation to generate a record generation result corresponding to the record generation requirement. The record generation result may comprise the record generation model relevant for a resolution to the query. In accordance with various embodiments of the present disclosure, the record generation result may include at least one numeral symbol associated with the record generation requirement. The numeral symbol may be associated with an invoice amount that may be included in the record generation result. As mentioned above, the record generation requirement may be associated with generating an invoice amount for a product, component or a service. The numeral symbol may be associated with the invoice amount for a product, component or a service.

In accordance with various embodiments of the present disclosure, the record predictor 150 may create a record generation library comprising the record index, the mapping context, and the selection rule associated with the record generation requirement. The record generation library may be used to process a future record generation requirement. In an example, the record generation library may be deployed by the system 110 to validate the record index for processing the record generation requirement. For example, the record predictor 150 may compare the record index associated with the record generation requirement with various record indices associated with previous record generation requirements that may be stored in the record generation library. Such a comparison may assist in validation of the record index for the record generation requirement thereby increasing the efficiency of the system 110. In accordance with various embodiments of the present disclosure, the record predictor 150 may deploy the record generation library for creating the record generation model. For example, the record predictor 150 may deploy the record indices, the mapping context, and the selection rule associated with previous record generation requirements that may be stored in the record generation library for creating the record generation model. In an example, the record predictor 150 may deploy the record indices, the mapping context, and the selection rule associated with previous record generation requirements that may be stored in the record generation library for validating the record generation model.

The record predictor 150 may implement a second cognitive learning operation to perform a record generation action to address the record generation requirement, based on the record generation result. In accordance with various embodiments of the present disclosure, the record predictor 150 may obtain a user input to implement the record generation result. In an example, the record predictor 150 may require user input to perform the record generation action to address the record generation requirement, based on the record generation result. In another example, the record predictor 150 may automatically perform the record generation action to address the record generation requirement, based on the record generation result. The system 110 may be configurable to perform record generation from the record data automatically and/or based on user input.

In accordance with various embodiments of the present disclosure, the record predictor 150 may obtain a user input to implement the record generation model corresponding to the record generation requirement based on the record index. In accordance with various embodiments of the present disclosure, the record predictor 150 may perform a record generation action to address the record generation requirement, based on the record generation result. In another example, the record predictor 150 may automatically initiate record generation from the record data to resolve the record generation requirement based on the record generation result. The system 110 may be configurable to perform record generation from the record data automatically and/or based on user input.

Accordingly, the system 110 may help in automatically billing the problem request related to a product technical service using advanced AI technologies. The system 110 may be a generalized and scalable intelligent system that may accurately bill thousands of technical service requests thereby, saving operation costs associated with Turn Around Time (TAT), Full-time equivalent (FTE) and other similar productive benefits. Additionally, the system 110 may learn from various historical problem requests and resolutions thereby, preventing revenue leakage resulting from various manual human errors in interpreting the text from the problem request and text from the customer billing contracts. The system 110 may be adapted to different domains such as for example, Information Technology (IT), Electronics, Electronic and Mechanical product domains for billing decisions as well as domain-specific problem understanding.

In accordance with various embodiments of the present disclosure, the system 110 may present a method for segmentation of billable query/request in a conversation thread from a client associated with a product technical service process. The system 110 may provide a method for detection and segregation of problem expressions generated by an organization; detection and segregation of technician resolution provided to a specified problem; linking all the previous reference problem expressions to a current problem expression, and summary of billable notes entered by an organization. The system 110 may present a method for classifying a given problem expression into billable, non-billable and further review decisions based on a historical problem request and corresponding ground truth. The system 110 may present a methodology for refining/curating the billable, non-billable and further review categories emitted by the knowledge extraction model. The system 110 may present a method for analyzing and understanding the problem request, automated billable services, and domain product knowledge extraction from historical expressions. The system 110 may present a methodology for building the knowledge graph/base of various customers, products, potential billable services, and part names extracted. The system 110 may present a method for determining, validating the billing amount and recommendations for a given product's problem request from the pre-determined billing contracts. The system 110 may present a method for compiling the textual billing summary notes using Natural Language Generation (NLG) and easily explainable and navigable visual graphs useful for human agents/technicians for problem-solving.

The embodiments for the artificial intelligence component, the first cognitive learning operation, and the second cognitive learning operation, presented herein are exemplary in nature and should be treated as such. For the sake of brevity and technical clarity, the description of the record generation system 110 may be restricted to few exemplary embodiments, however, to a person skilled in the art it should be clear that the system may be used for the fulfillment of various record generation requirements other than those mentioned hereinafter.

Figure 2:
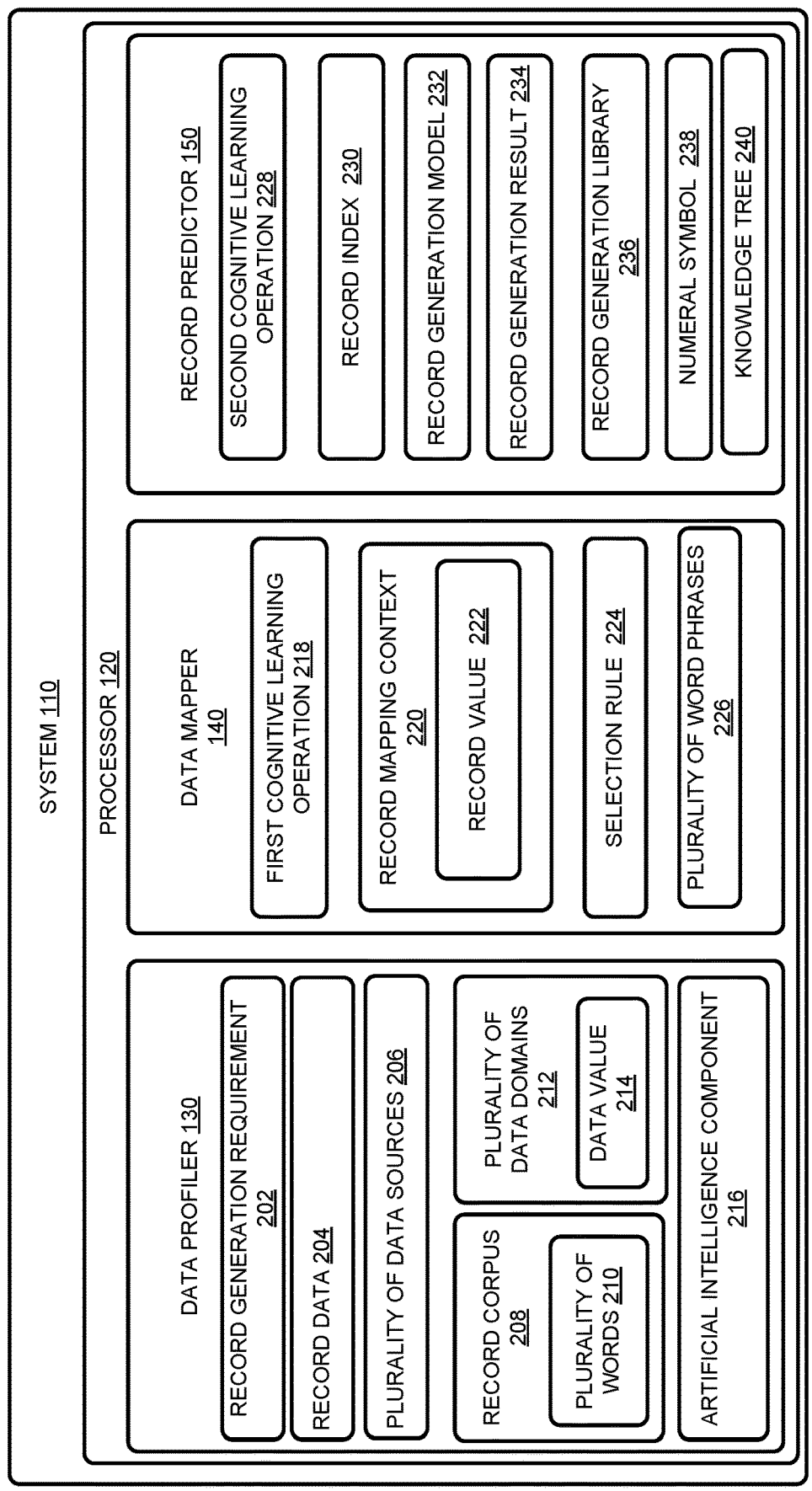
FIG. 2 illustrates various components of a record generation system, according to an example embodiment of the present disclosure.

FIG. 2 illustrates various components of the record generation system 110, according to an example embodiment of the present disclosure. In an example, the system may include a processor, a data profiler 130, a data mapper 140, a record predictor 150. The processor may be coupled to the data profiler 130, the data mapper 140, the record predictor 150.

The data profiler 130 may receive a query from a user. The query may indicate a record generation requirement 202. The record generation requirement 202 may be relevant for the generation of invoice records (also referred to as "invoice" hereinafter) pertaining to various products, product components (also referred to as "components" hereinafter) and services offered by an organization. In accordance with various embodiments of the present disclosure, the record generation requirement 202 may be relevant to the generation of records pertaining to various products and services offered by an organization. The record generation requirement 202 may be relevant to the intelligent and optimal matching of various client bill contract documents with various rules pertaining to invoicing various products and services for generating an invoice for a particular product or a service for a particular customer. The record generation requirement 202 may be relevant to the identification of various revenue leakage avenues that may be created as a consequence of an invoice generation process. The record generation requirement 202 may be relevant to minimization of various revenue leakage avenues that may be created as a consequence of the invoice generation process. The record generation requirement 202 may be relevant to minimizing the human effort required for invoice generation. In an example, the human effort may be minimized by limiting the number of requests that may require additional review for validating the billing decision. The number of requests may be limited by identifying missing information from the technician notes through the intelligent and optimal matching of various client bill contract documents with various rules pertaining to invoicing various products and services for generating an invoice for a particular product or a service for a particular customer. The record generation requirement 202 may be relevant for recommending the most appropriate billing components and services to enable better decision making regarding invoice record generation. The record generation requirement 202 may be relevant to creating a product knowledge database by using various Artificial Intelligence (AI) methods and comprising comprehensive information above various products, components, and services associated with an organization. The record generation requirement 202 may include leveraging the product knowledge base for both problem resolution and problem understanding by using advanced Artificial Intelligence (AI) methods. In an example, the record generation requirement 202 may be associated with at least one of a process, an organization, and an industry-relevant for data assessment for invoice record generation operations. The record generation requirement 202 may be related to generating key insights and data related to the generation of various invoices and records pertaining to various products, services, and components offered by an organization. The embodiments for the record generation requirement 202 presented herein may be exemplary in nature and a person skilled in the art must understand that the record generation requirement 202 may include generation of various records not mentioned herein.

The data profiler 130 may obtain record data 204 and a plurality of user documents associated with the query from a plurality of data sources 206. The record data 204 may be data may include names of various products, components, and services. The record data 204 may include information related to invoice amounts for various products, components, and services. The record data 204 may include geographical locations for various customers and various offices of an organization. The record data 204 may include various contract plans, which may be customized for a client. The record data 204 may include various service notes received from a technician pertaining to client concerns regarding various products, components, and services. The record data 204 may include various conversations and communication that may be received from a client regarding various products, components, and services. The record data 204 may include information related to technical expertise requirements for resolving concerns related to various products, components, and services. The record data 204 may include information related to time duration, for example, the number of hours, for resolving concerns related to various products, components, and services. The record data 204 may include information related to various products, components, and services, various clients, client invoice plans, client subscription plans, client payment plans, client requirements, technical expertise, required time duration associated with various products, components, and services. In accordance with various embodiments of the present disclosure, the record data 204 may include data generated from processing historical record generation requirements 202.

The plurality of user documents may include various documents pertaining to concerns related to various products, components, and services. The plurality of user documents may include entitlement descriptions such as client invoice plans, client subscriptions, and the like. The plurality of user documents client concern description, problem expression, and the like. In accordance with various embodiments of the present disclosure, the plurality of user documents may be received by the system 110 from a user. In an example, the plurality of user documents may be stored in the system 110. The plurality of data sources 206 may include various databases maintained by an organization. In an example, the plurality of data sources 206 may include various databases that may be subscribed by an organization. In accordance with various embodiments of the present disclosure, the data profiler 130 may obtain the record data 204 from multiple data sources amongst the plurality of data sources 206 for resolving the query. In an example, the data profiler 130 may obtain the plurality of user documents and the record data 204 from different data sources amongst the plurality of data sources 206 for resolving the query.

The data profiler 130 may implement an artificial intelligence component 216 to identify a record corpus 208 from the record data 204. The record corpus 208 may be an annotated collection of written texts, service notes, invoice plans, invoice generation rules, client information such as client address, client invoice plans, and the like from the record data 204. The record corpus 208 may include an organized collation of the record data 204. The artificial intelligence component 216 may comprise the implementation of an algorithm that may include an intelligent machine learning module that may help in analyzing, extracting and classifying information from the record data 204 and help in building the record corpus 208. The implementation of NLP techniques may a continuous process and may enrich the record corpus 208. The data profiler 130 may implement the artificial intelligence component 216 on a result from historical record generation requirements 202 and update the same in the record corpus 208. In accordance with various embodiments of the present disclosure, the data profiler 130 may obtain the record data 204 on a near real-time basis from the plurality of data sources 206. The data profiler 130 may implement the artificial intelligence component 216 on the record data 204 obtained on a near real-time basis for creating the record corpus 208. The artificial intelligence component 216 may provide comprehension of the record data 204 in form of the record corpus 208.

The record corpus 208 may include a plurality of words 210 associated with the record generation requirement 202. The plurality of words 210 may include a list of words that may be comprised within the record corpus 208. The plurality of words 210 may be various words associated with written texts, service notes, invoice plans, invoice generation rules, client information such as client address, client invoice plans, and the like from the record data 204. The plurality of words 210 may include words associated with information related to various products, components, and services, various clients, client invoice plans, client subscription plans, client payment plans, client requirements, technical expertise, required time duration associated with various products, components, and services, and the like. The plurality of words 210 may include all the words included in the record corpus 208. In accordance with various embodiments of the present disclosure, the plurality of words 210 may include an annotation associated with any of the words on the record corpus.

The data profiler 130 may implement the artificial intelligence component 216 to sort the record data 204 into a plurality of data domains 212 based on mapping the plurality of words 210 with the plurality of user documents. In accordance with various embodiments of the present disclosure, the data profiler 130 may deploy various NLP techniques and data mining techniques (explained below) for extracting data from the plurality of user documents. The data profiler 130 may implement various NLP techniques on the record corpus 208 from historical record generation requirements 202 and map the same with a present record generation requirement 202 to create the plurality of data domains 212. The plurality of data domains 212 may include data mined from the plurality of data sources 206, such as for example, service notes, various databases, and the like. The plurality of data domains 212 may include data such as for example, knowledge pertaining to various products and services such as component name, service name, part numbers, part order numbers, quantities and billing amounts, client interactions, client geographical locations, client invoice plans, client subscriptions and the like. The plurality of data domains 212 may include the record corpus 208 mapped with the plurality of user documents to identify a similarity, thereby assisting in resolving the query. Each of the plurality of data domains 212 may comprise a data value 214 associated with the record generation requirement 202. The data value 214 may include data present in any of the data domains from the plurality of data domains 212. In accordance with various embodiments of the present disclosure, the data profiler 130 may update the record corpus 208 and the plurality of data domains 212, based on an update in the record data 204 or based on an update in the plurality of user documents. For example, if a new service may be launched by an organization, the record data 204 may be updated for the same. The data profiler 130 may update the record corpus 208 and the plurality of data domains 212 to reflect the update in the record data 204. In an example, there may be a modification in the plurality of user documents such as for example, request for a new service, the data profiler 130 may update the record corpus 208 and the plurality of data domains 212 to reflect the update in the plurality of user documents.

The artificial intelligence component 216 may include the implementation of various natural language processing (NLP) techniques such as data parsing, data annotation, data crawling and the like for processing the record data 204 to generate the record corpus 208, identification of the plurality of words 210 and generation of the plurality of data domains 212. For the sake of brevity and technical clarity the NLP techniques have not been explained in detail herein, however, the same should be clear to a person skilled in the art. The NLP techniques may include detection and segregation of a problem expression that may be generated by a machine and technician problem resolution notes. In an example, the NLP techniques may include the implementation of algorithms such as Conditional Random Fields (CRFs) bi-directional and attention-based Long short-term memory networks for training and inference. The NLP techniques may identify problem expressions by annotating the boundaries of machine-generated and technician generated problem expressions from record data 204. The annotation may be done using the record corpus 208. In accordance with various embodiments of the present disclosure, the artificial intelligence component 216 may include an algorithm for linking record data 204 from historical record generation requirements 202 to a present record generation requirement 202. The aforementioned linking may be done through identifying a pattern from a current problem expression and capturing the state of the previous problem resolution for similar problem expressions from the record data 204. The algorithm for linking may be, for example, a customized algorithm based on the similarity of patterns using various NLP and semantic contextual embeddings such as Embeddings from Language Models (ELMo) algorithm, Bidirectional Encoder Representations from Transformers (BERT) algorithm. The ELMo algorithm may enable the data profiler 130 to understand different nuances associated with a word from the record data 204. The BERT algorithm may enable the data profiler 130 to learn the context of a word from the records data based on the surroundings of the word. In an example, a similar problem expression may refer to problem expression for the same client, problem expressions related to the same product, component, and service, problem expression related to the same client invoice plans, problem expression related to the same geographical location, and the like.

In accordance with various embodiments of the present disclosure, the artificial intelligence component 216 may include the NLP techniques for mining knowledge pertaining to various products, components, and services from the plurality of data sources 206 such as for example, various databases. The artificial intelligence component 216 may create a knowledge mining model using various algorithms such as ELMo, BERT, Zero-shot based learning using KG embeddings and the like. The knowledge may include component name, service name, component numbers, component order numbers, quantities and billing amounts. The plurality of data sources 206 may include various websites across the Internet. The data profiler 130 may crawl the websites for the aforementioned knowledge and may link various components to corresponding products. In an example, the data profiler 130 may identify a gap in knowledge from the internal databases. The data profiler 130 may fill the gap by crawling for knowledge from various websites across the Internet. The data profiler 130 may mine data from invoice notes and chargeable line items such as component names, services, labor, travel, and the like, phrases using which an organization may perform a billing validation. The artificial intelligence component 216 may deploy the NLP techniques to mine all the part names and services from these textual documents. In an example, the chargeable line items data may not be available then, the data profiler 130 may mine knowledge from invoice notes data if it may be available. The artificial intelligence component 216 may deploy the NLP techniques to compile a list of component names and services from various client contract bill plan matrices if they may be available. The data profiler 130 may aggregate data pertaining to various products, components, and services such as component names and associated services as mentioned above prepare a lookup of component names and services.

The artificial intelligence component 216 may include the NLP techniques for discovering knowledge pertaining to various products, components, and services from service notes. The service notes may be related to the query. In an example, the service notes may be associated with historical record generation requirements 202. The data profiler 130 may mine knowledge pertaining to various products, components, and services from service notes when the plurality of data sources 206 mentioned above may not be available. In an example, the data profiler 130 may mine knowledge pertaining to various products, components, and services from service notes irrespective of data mining done on other data sources from the plurality of data sources 206. In accordance with various embodiments of the present disclosure, the data mining from the service notes may be done based on deploying an NLP-based parsing approach to discover component names and services from service notes data.

The artificial intelligence component 216 may include the NLP techniques for mining component numbers, component order numbers, and quantities associated with component names from record data 204. The data profiler 130 may use component part numbers extracted as part of knowledge extraction as mentioned above. The data profiler 130 may tag each of the component part numbers from the knowledge extracted from various databases. In an example, the data profiler 130 may tag component order numbers. The tagging may be done using the Regular Expression (RegEx) algorithm. In an example, the tagging may include marking numbers with a marker such as "#". The data profile may determine quantities of component parts for a particular order such as for example, "four (4) Keys" from a number of tagging markers. In an example, the data profiler 130 may directly determine quantities of component parts such as for example, "four (4) Keys" for a particular order from numeric quantities mentioned in the extracted knowledge. The artificial intelligence component 216 may associate the component numbers, order numbers and quantities with component names as identified above.

The artificial intelligence component 216 may include the NLP techniques for the detection of billing amounts pertaining to various products, components, and services from service notes. The billing amounts may be quoted in the service notes by a technician. The artificial intelligence component 216 may detect the same using the RegEx algorithm. The artificial intelligence component 216 may include the NLP techniques for amalgamation of mining data. The artificial intelligence component 216 may compile the data extracted from the record data 204 and the plurality of user documents as described above and compiled to create the plurality of data domains 212. The artificial intelligence component 216 may include the NLP techniques for automatic annotation of service notes with part names, services, part numbers and quantities, and the like. The artificial intelligence component 216 may automatically tag component names, component numbers, orders, quantities and amounts for the sampled training data of service notes. The artificial intelligence component 216 may resolve any discrepancy with the data value 214 from the plurality of data domains 212 while tagging.

The artificial intelligence component 216 may include an equipment and services knowledge extraction engine that may deploy an algorithm such as for example, CRF, Bidirectional LSTM, and Zero-shot based learning using Knowledge Graph (KG) embedding. The artificial intelligence component 216 may select appropriate features associated with the plurality of data domains 212. The features may include measurable parameters associated with the record data 204. For example, the features may include various products, components, and services, various clients, client invoice plans, client subscription plans, client payment plans, client requirements, technical expertise, required time duration associated with various products, components, and services, and the like. The artificial intelligence component 216 may train the knowledge extraction model (mentioned above) and may learn from the same. The artificial intelligence component 216 may evaluate the accuracy of the extraction model on a separate test data set. The artificial intelligence component 216 may list all the equipment's component names, services, component numbers and quantities that may be extracted using the knowledge extraction model. The record corpus 208 may include the list of all the equipment's component names, services, component numbers and quantities that may be extracted using the knowledge extraction model.

The artificial intelligence component 216 may include the NLP-based parsing approach for identifying negative phrases such as services that may not be performed by a technician and various faults/errors of the equipment. The data profiler 130 may detect and extract negative actions/phrases such as for example, "Keys are not replaced". The data profiler 130 may detect and extract errors/malfunctions of equipment, such as for example, "Button is not working".

The data mapper 140 may implement a first cognitive learning operation 218 to determine at least one record mapping context 220 associated with record generation requirement 202 from the plurality of user documents. The mapping context may include a record value of 222 from the plurality of user documents. The record mapping context 220 may be a part of the plurality of user documents that may include various mapping features such as problem statement, client information, client billing contracts, client service subscriptions, client entitlements, and the like. The record value 222 may refer to the data identified as relevant for various mapping features such as problem statement, client information, client billing contracts, client service subscriptions, client entitlements, and the like.

In accordance with various embodiments of the present disclosure, the data mapper 140 may determine the record value 222 to include a plurality of word phrases 226 identified from the plurality of user documents. The plurality of word phrases 226 may include various words, or sentences relevant for various mapping features such as problem statement, client information, client billing contracts, client service subscriptions, client entitlements, and the like.

The data mapper 140 may implement the first cognitive learning operation 218 to determine a selection rule 224 (also referred to as "selection rules 224" hereinafter) from the plurality of data domains 212 for each of the record mapping context 220 associated with the record generation requirement 202. As mentioned above, the record corpus 208 may include information related to various products, components, and services, various clients, client invoice plans, client subscription plans, client payment plans, client requirements, technical expertise, required time duration associated with various products, components, and services, and the like. The data mapper 140 may map the plurality of word phrases 226 with the record corpus 208 to determine the selection rule 224 from the plurality of data domains 212. The data mapper 140 may map the plurality of word phrases 226 from the relevant information from the record corpus 208 to determine the selection rule 224. The selection rule 224 may refer to a set of selection criteria that may be deployed by the data mapper 140 for mining data relevant for processing the record generation requirement 202 from the plurality of data domains 212. For example, the data mapper 140 may develop the selection rule 224 for mining invoice information for a particular service related to a particular product for a client with a particular billing contract. The data mapper 140 may develop the selection rule 224 for mining invoice information for a particular service related to a particular product for a client with a particular geographical location. data mapper 140 may develop the selection rule 224 for mining invoice information for a particular service related to a particular product for a client with a particular service subscription. data mapper 140 may develop the selection rule 224 for mining invoice information for a particular service related to a particular product for a client. The data mapper 140 may develop the selection rule 224 for mining invoice information for a particular client for all services requested generated by that particular client.

As mentioned above, the record corpus 208 may include information related to invoice amounts for each of the various products, components, and services, various clients, client invoice plans, client subscription plans, client payment plans, client requirements, technical expertise, required time duration associated with various products, components, and services, and the like. In an example, the data mapper 140 may develop a selection rule 224 for selecting appropriate invoice amounts for the various products, components, and services based on various clients, client invoice plans, client subscription plans, client payment plans, client requirements, technical expertise, required time duration associated with various products, components, and services, and the like. For example, the data mapper 140 may develop a selection rule 224 to categorize various products, components, and services as "non-billable" based on various clients, client invoice plans, client subscription plans, client payment plans, client requirements, technical expertise, required time duration associated with various products, components, and services, and the like. The "non-billable" products, components, and services may be exempt from the accrual of any financial consideration. In an example, the data mapper 140 may develop a selection rule 224 to categorize various products, components, and services as "billable" based on various clients, client invoice plans, client subscription plans, client payment plans, client requirements, technical expertise, required time duration associated with various products, components, and services, and the like. The "billable" products, components, and services may be included for accrual of any financial consideration. In accordance with various embodiments of the present disclosure, the first cognitive learning operation 218 may be implemented to categorize various products, components, and services as "billable" and/or "non-billable" based on various clients, client invoice plans, client subscription plans, client payment plans, client requirements, technical expertise, required time duration associated with various products, components, and services, and the like.

In an example, the data mapper 140 may implement the first cognitive learning operation 218 to update the record corpus 208 based on the plurality of word phrases 226. For example, the data mapper 140 may identify that various words such as a new service request, a new product description, a new product component description, and a synonymous term related to an existing product, component, or service from the plurality of word phrases 226 may not be included in the record corpus 208. The data mapper 140 may annotate the plurality of word phrases 226 that may not be included in the record corpus 208 by implementing the first cognitive learning operation 218. The first cognitive learning operation 218 may include various NLP techniques described above.

The record predictor 150 may implement a second cognitive learning operation 228 to create a record index 230 corresponding to the plurality of user documents based on application of the selection rule 224 on the plurality of user documents. The record index 230 may include a list of various products, components, and services associated with the plurality of user documents being categorized appropriately into billable and/or non-billable based on client information, client invoice plans, client subscription plans, client payment plans, client requirements, technical expertise, required time duration associated with various products, components, and services, and the like. For example, the record index 230 may include all the billable and all the non-billable products, components, and services that may be associated with the plurality of user documents for a client. The record index 230 may include all the billable and all the non-billable products, components, and services that may be associated with the record generation requirement 202 categorized based on client information, client invoice plans, client subscription plans, client payment plans, client requirements, technical expertise, required time duration associated with various products, components, and services, and the like. In accordance with various embodiments of the present disclosure, record predictor 150 may implement the second cognitive learning operation 228 to predict the billable and the non-billable products, components, and services that may be included in the record index 230. An exemplary embodiment for implementation of the second cognitive learning operation 228 to predict the billable and the non-billable products, components, and services that may be included in the record index 230 may be illustrated by way of FIG. 5.

The record predictor 150 may implement the second cognitive learning operation 228 to create a record generation model 232 corresponding to the record generation requirement 202 based on the record index 230. The record generation model 232 may comprise the data value 214 from the plurality of data domains 212 associated with the record value 222 from the record mapping context 220 based on the selection rule 224. The record generation model 232 may include appropriate invoice amounts for all the billable and non-billable products, components, and services based on client information, client invoice plans, client subscription plans, client payment plans, client requirements, technical expertise, required time duration associated with various products, components, and services, and the like, which may be associated with the plurality of user documents for a client.

In accordance with various embodiments of the present disclosure, the record predictor 150 may create the record generation model 232 as a knowledge tree 240 (also referred to as "knowledge graph 240") comprising the data values 214 from the plurality of data domains 212 distributed across the knowledge tree 240 based on the mapping context and the selection rule 224. The knowledge tree 240 may be a decision tree-based representation of the record generation model 232, wherein various products, components, and services may be arranged in a decision tree format comprising a plurality of nodes (explained in detail by way of subsequent FIGS.). In accordance with various embodiments of the present disclosure, each of the plurality of nodes may represent a product, a component, a service, a client, a client invoice plan, a client subscription plan, a client payment plan, a client requirement, technical expertise, required time duration associated with various products, components, and services. In an example, the knowledge tree 240 may be constructed such that to include products, components, and services associated with the products, the components, and the services relevant to the record generation requirement 202 (explained in detail by way of subsequent FIGS.).

The record predictor 150 may implement the second cognitive learning operation 228 to generate a record generation result 234 corresponding to the record generation requirement 202. The record generation result 234 may comprise the record generation model 232 relevant for a resolution to the query. In accordance with various embodiments of the present disclosure, the record generation result 234 may include at least one numeral symbol 238 associated with the record generation requirement 202. The numeral symbol 238 may be associated with an invoice amount that may be included in the record generation result 234. As mentioned above, the record generation requirement 202 may be associated with generating an invoice amount for a product, component or a service. The numeral symbol 238 may be associated with the invoice amount for a product, component or a service.

In accordance with various embodiments of the present disclosure, the record predictor 150 may create a record generation library 236 comprising the record index 230, the mapping context, and the selection rule 224 associated with the record generation requirement 202. The record generation library 236 may be used to process a future record generation requirement 202. In an example, the record generation library 236 may be deployed by the system 110 to validate the record index 230 for processing the record generation requirement 202. For example, the record predictor 150 may compare the record index 230 associated with the record generation requirement 202 with various record indices associated with previous record generation requirements 202 that may be stored in the record generation library 236. Such a comparison may assist in validation of the record index 230 for the record generation requirement 202 thereby increasing the efficiency of the system 110. In accordance with various embodiments of the present disclosure, the record predictor 150 may deploy the record generation library 236 for creating the record generation model 232. For example, the record predictor 150 may deploy the record indices, the mapping context, and the selection rule 224 associated with previous record generation requirements 202 that may be stored in the record generation library 236 for creating the record generation model 232. In an example, the record predictor 150 may deploy the record indices, the mapping context, and the selection rule 224 associated with previous record generation requirements 202 that may be stored in the record generation library 236 for validating the record generation model 232.

The record predictor 150 may implement a second cognitive learning operation 228 to perform a record generation action to address the record generation requirement 202, based on the record generation result 234. In accordance with various embodiments of the present disclosure, the record predictor 150 may obtain a user input to implement the record generation model 232 corresponding to the record generation requirement 202 based on the record index 230. In accordance with various embodiments of the present disclosure, the record predictor 150 may perform a record generation action to address the record generation requirement 202, based on the record generation result 234. In another example, the record predictor 150 may automatically initiate record generation from the record data 204 to resolve the record generation requirement 202 based on the record generation result 234. The system 110 may be configurable to perform record generation from the record data 204 automatically and/or based on user input.

The embodiments for the artificial intelligence component 216, the first cognitive learning operation 218, and the second cognitive learning operation 228, presented herein are exemplary in nature and should be treated as such. For the sake of brevity and technical clarity, the description of the record generation system 110 may be restricted to few exemplary embodiments, however, to a person skilled in the art it should be clear that the system may be used for the fulfillment of various record generation requirements 202 other than those mentioned hereinafter.

Accordingly, the system 110 may help in automatically billing the problem request related to a product technical service using advanced AI technologies. The system 110 may be a generalized and scalable intelligent system that may accurately bill thousands of technical service requests thereby, saving operation costs associated with Turn Around Time (TAT), Full-time equivalent (FTE) and other similar productive benefits. Additionally, the system 110 may learn from various historical problem requests and resolutions thereby, preventing revenue leakage resulting from various manual human errors in interpreting the text from the problem request and text from the customer billing contracts. The system 110 may be adapted to different domains such as for example, Information Technology (IT), Electronics, Electronic and Mechanical product domains for billing decisions as well as domain-specific problem understanding.

Figure 3:
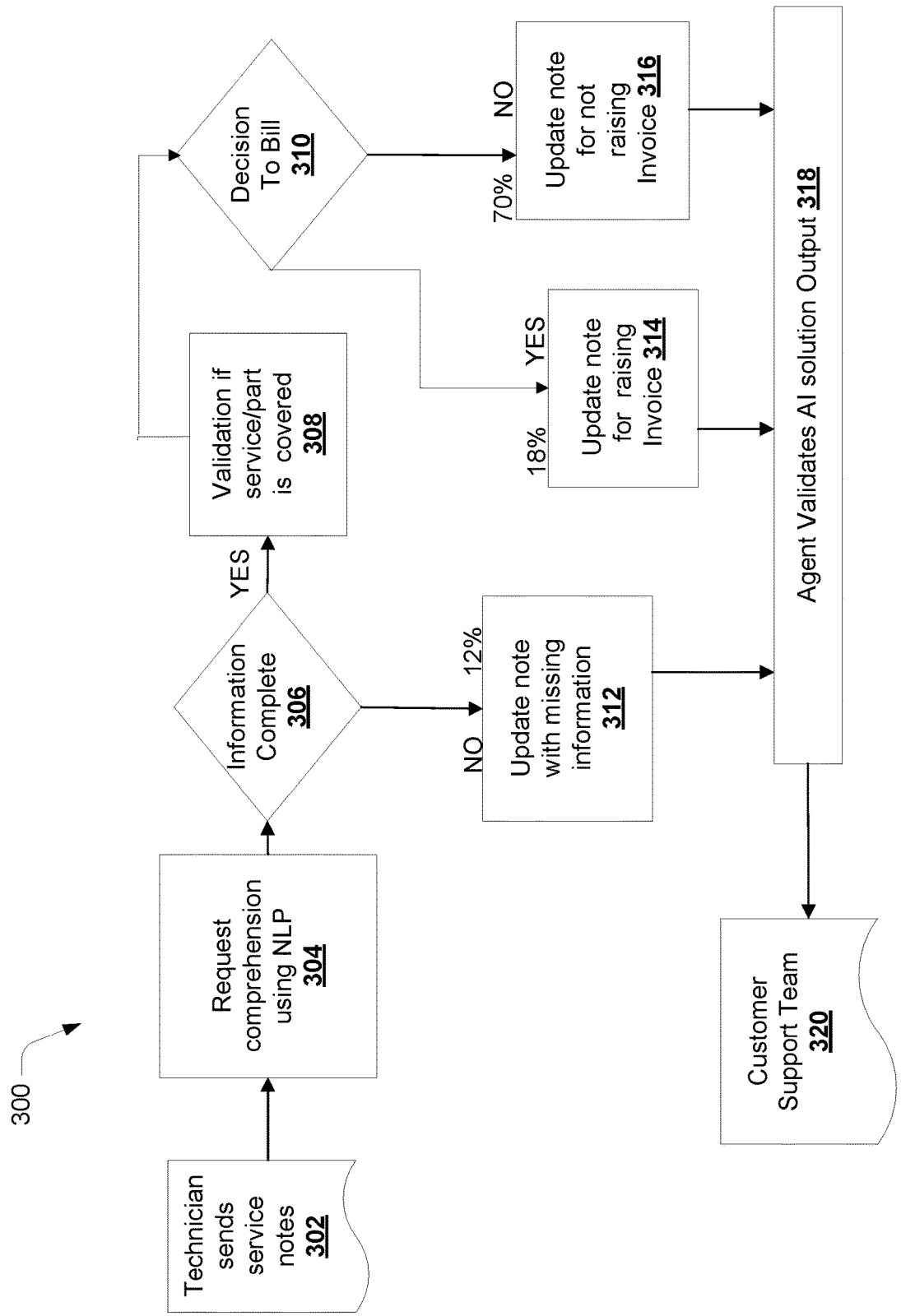
FIG. 3 illustrates a process flow diagram for a record generation process using a record generation system, according to an example embodiment of the present disclosure.

FIG. 3 illustrates a process flow diagram 300 for a record generation process using the record generation system 110, according to an example embodiment of the present disclosure. For the sake of brevity and technical clarity, the components described above for the system 110 may be referred herein. The flow diagram 300 may be deployed for processing the record generation requirement 202 using the system 110. The flow diagram 300 may include an obtaining step 302, wherein a trained professional may send service notes to the system 110. The service notes may be a part of the record data 204. The flow diagram 300 may include a request 304. The request 304 may refer to the implementation of the artificial intelligence component 216 on the service notes received from the obtaining step 302. The flow diagram 300 may further include a data check 306. The data check 306 may check if the data received by the obtaining step 302 may be complete. For the purpose of this disclosure document, the data completeness may refer to data including measurable features from products, components, and services based on client information, client invoice plans, client subscription plans, client payment plans, client requirements, technical expertise, required time duration associated with various products, components, and services, and the like, which may be associated with the plurality of user documents for a client. For a set of data to marked complete by the check 306, the data received by the obtaining step 302 may include information related to various products, components, and services based on client information, client invoice plans, client subscription plans, client payment plans, client requirements, technical expertise, required time duration associated with various products, components, and services, and the like. In an example, the check 306 may not identify the data received from the obtaining step 302 to be complete and the flow diagram 300 may execute an update 312. The update 312 may include updating the missing information for making the data complete. The update 312 may execute a validation 318, wherein a technical expert may validate the information updated through the update 312. The results from the validation 318 may be sent to a support team 320. The support team 320 may be comprised of trained experts for manually processing record generation requirements. In an example, 12% of the datasets obtained from the obtaining step 302 may require the update 312 and the validation 318 thereafter. In an example, the check 306 may identify the data received from the obtaining step 302 to be complete and the flow diagram 300 may execute a validation 308. The validation 308 may include validating for inclusiveness of the products, components, and services associated with the data obtained from the obtaining step 302 based on client information, client invoice plans, client subscription plans, client payment plans, client requirements, technical expertise, required time duration associated with various products, components, and services, and the like. The validation 308 may include referring to the record corpus 208 for validation of the data obtained from the obtaining step 302.

The flow diagram 300 may include a check 310 to check if the data obtained after validation 308 may be billable or non-billable. As mentioned above, the data mapper may determine various products, components, and services as billable or non-billable based on the implementation of the first cognitive learning operation 218 on the selection rule 224 and the record corpus 208. In accordance with various embodiments of the present disclosure, the system 110 may obtain historical record data 204 for the past few years such as the past 1-2 years. The data profiler 130 may process the historical record data 204 by the implementation of the artificial intelligence component 316 and identify record data based on the record mapping context 220, such as for example, a product type and a client invoice plan type. The first artificial intelligence component may uniformly sample the historical record data 204 for training a present prediction model to identify a product type for a client invoice plan type as billable or non-billable. The check 310 may evaluate accuracy on separate test data set for billable/Non-billable cases. The check 310 may compute accuracy and false negatives on 'Billable' cases. The check 310 may further include improving the accuracy for billing decisions on 'Billable' cases. The check 310 may leverage the selection rule 224 and client-specific contracts related to various products components, services for altering the error predictions from the learned prediction model. The check 310 may update the selection rule 224 based on the data received from the validation 308. The check 310 may generate a list of keywords for correcting any false negatives on 'Billable' cases made from previous prediction models for historical record data 204. The check 310 may generate predictions for the data received from the validation 308 based on the "billable" and "non-billable" cases from previous prediction models. The check 310 may further run the predictions through the list of keywords for correcting any false negatives on 'Billable' cases. The check 310 may reverse the mistakes made in the generation of the present prediction model that may lead to the identification of false negatives on 'Billable' cases. The check 310 may include implementation of the artificial intelligence component 216, and the first cognitive learning operation 218. In an example, the check 310 may identify a dataset to be billable, the process flow diagram 300 may execute an update 314. The update 314 may include an update for raising an invoice. In an example, the check 310 may identify a dataset to be non-billable, the process flow diagram 300 may execute an update 316. The update 316 may include an update for not raising an invoice. The update 314 and the update 316 may be followed by the validation 318. The results from the validation 318 may be sent to the support team 320.

Figure 4A:
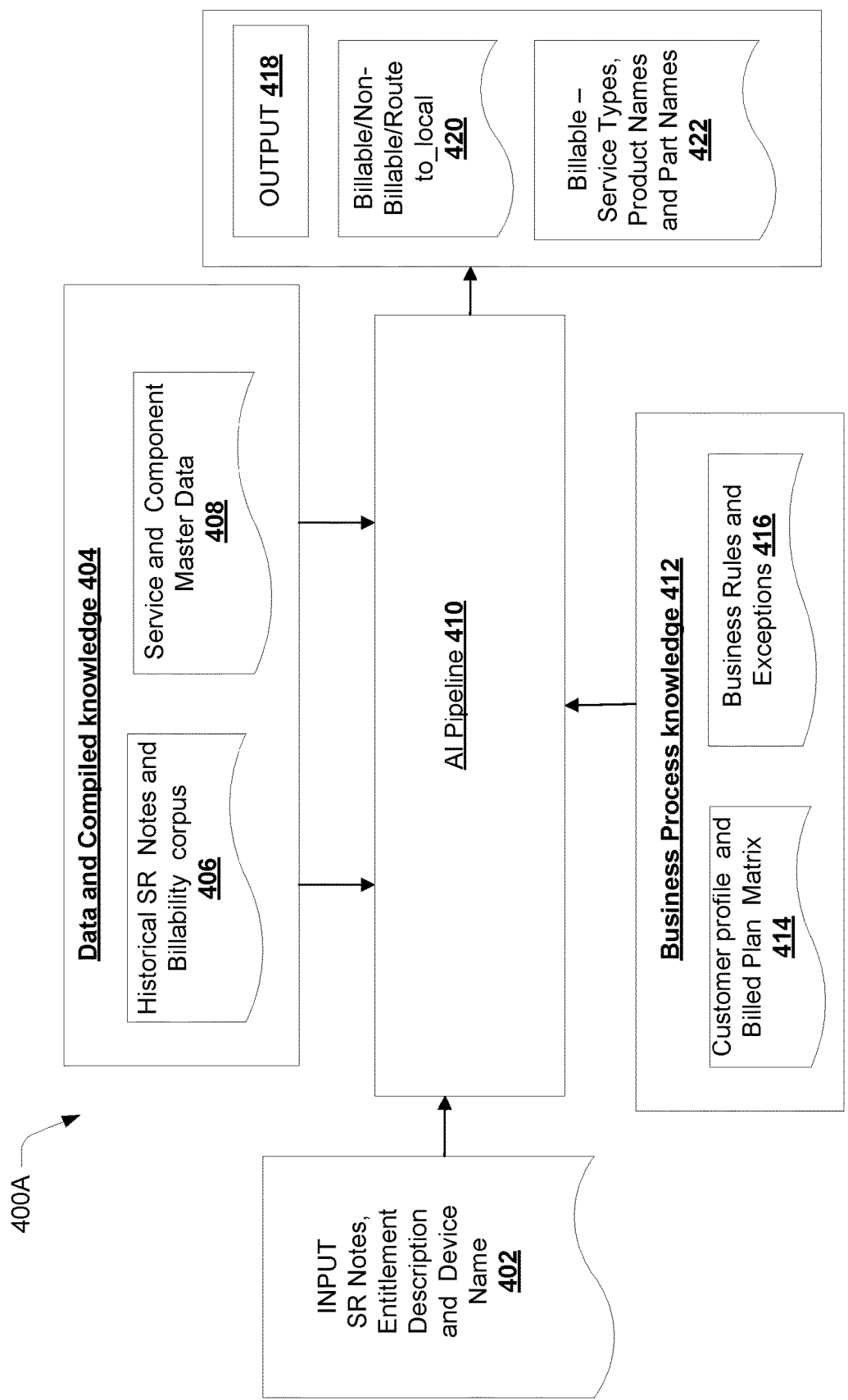
FIG. 4A illustrates a process flow diagram for a technical architecture of a record generation system, according to an example embodiment of the present disclosure.

FIG. 4A illustrates a process flow diagram 400A for a technical architecture of the record generation system 110, according to an example embodiment of the present disclosure. For the sake of brevity and technical clarity, the components described above for the system 110 may be referred herein. The process flow diagram 400A may include an input 402. The input may include service record notes, client entitlement description, information from record data 204, and the like. The process flow diagram 400A may further include a knowledge database 404. The knowledge database 404 may include compiled knowledge of a historical corpus 406 and a service component master data 408. The historical corpus 406 may include historical service notes, historical billing corpus. The historical billing corpus may be a part of the record corpus 208 wherein information related to historical billing related information may be annotated and stored. The service component master data 408 may be a part of the record corpus 208 wherein, information related to various products, components and services may be annotated and stored.

The process flow diagram 400A may include a process knowledge database 412. The process knowledge database 412 may include a customer profile and bill plan matrix 414, and a rules and exceptions component 416. The customer profile and bill plan matrix 414 may include information pertaining to various clients such as invoice plans, invoice subscriptions, invoice entitlements, service inclusions in invoice plans for various clients, and the like. The rules and exceptions component 416 may include all the selection rules 224 and all the exceptions to the selection rules 224. The process flow diagram 400A may include an AI pipeline 410. In accordance with various embodiments of the present disclosure, AI pipeline 410 may implement the artificial intelligence component 216, the first cognitive learning operation 218, and the second cognitive learning operation 228 for processing data received from the knowledge database 404, the process knowledge database 412, and the input 402. Various components of the AI pipeline 410 have been described in detail by way of FIG. 1, FIG. 2, and FIG. 4B.

The AI pipeline 410 may generate an output 418 by processing data received from the knowledge database 404, the process knowledge database 412, and the input 402. The AI pipeline 410 may process data by implementing the artificial intelligence component 216, the first cognitive learning operation 218, and the second cognitive learning operation 228. The output 418 may include a billable/non-billable router 420 and a billability corpus 422. The billable/non-billable router 420 may route the record data 204 to a Subject Matter Expert (SME) for additional clarification if enough information for billing and non-billing classification may not be available in the billing service request (SR). In accordance with various embodiments of the present disclosure, the billable/non-billable router 420 may route the record to the SME for further review of a conclusion inferred by the AI pipeline 410 with regards to a product, a service, or a component being "billable" or "non-billable". In an example, the SME may be located at a geographical location that may be nearest to a geographical location mentioned in the SR. As mentioned above, the AI pipeline 410 may implement any of the artificial intelligence component 216, the first cognitive learning operation 218, and the second cognitive learning operation 228 to classify the various products, components, and services as "non-billable" or "billable" based on various clients, client invoice plans, client subscription plans, client payment plans, client requirements, technical expertise, required time duration associated with various products, components, and services, and the like (explained in detail by way of FIG. 4B). The "non-billable" products, components, and services may be exempt from the accrual of any financial consideration. The "billable" products, components, and services may lead to the accrual of financial consideration. The billability corpus 422 may include information related to various products, components, and services from the record generation requirement 202 that may be classified as "billable". In accordance with various embodiments of the present disclosure, the billability corpus 422 may include various service types, product names, and component names that have been classified as "billable" for processing the record generation requirement 202.

Figure 4B:
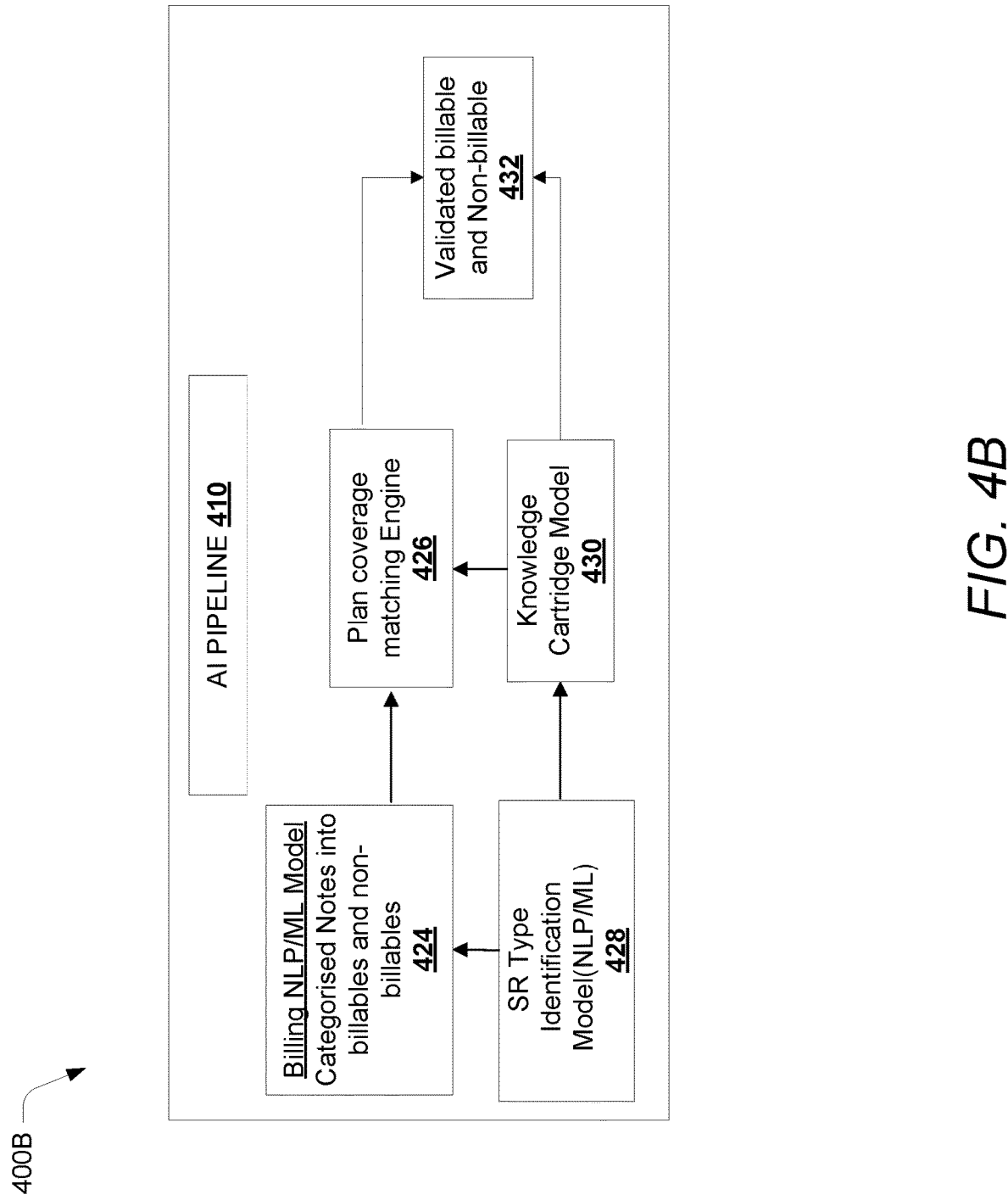
FIG. 4B illustrates a process flow diagram for an artificial intelligence pipeline from the technical architecture of a record generation system, according to an example embodiment of the present disclosure.

FIG. 4B illustrates a process flow diagram 400B for the artificial intelligence pipeline 410 from the technical architecture of the record generation system 110, according to an example embodiment of the present disclosure. For the sake of brevity and technical clarity, the components described above for the system 110 may be referred herein. The artificial intelligence pipeline 410 may include a service record identification 428, a billing NLP and ML model 424, a plan coverage matching engine 426, a knowledge cartridge model 430, and a billable-non-billable validation 432.

The knowledge cartridge model 430 may include building a knowledge network of part names, services leveraging chargeable line items and customer contracts/bill plans. The knowledge cartridge model 430 may compile all the part names and services from the service record (SR) notes knowledge for a given device and customer for billable cases. The knowledge cartridge model 430 may compile all the part names & services from the historical chargeable line items and invoice billing notes data for each device and customer combination or from the invoice documents data for billable cases. The knowledge cartridge model 430 may compile the BERT/ELMO embeddings from the processed historical notes and get the related part names, products, services using similarity of vectors method and use it for enriching the knowledge tree 240. The knowledge cartridge model 430 may map the extracted part names, services from SR notes and invoice billing data with the chargeable line items, part names, services that may be matched against the client invoice plans and contracts. In an example, the mapping is done using fuzzy or full phrase matching techniques such as Cosine similarity or Word2Vec™ and other similar methods. The knowledge cartridge model 430 may construct the knowledge tree 240 where part names, subpart names, and services may become the leaf nodes while the concepts mentioned in Bill plan contracts or chargeable line items become parent/high-level nodes at level-2 and device name becomes the parent node at level-3 and finally, the device name is the top node. The knowledge tree 240 with the part names may be considered as equipment component knowledge cartridge (explained by way of subsequent FIGS.) whereas the knowledge tree 240 of services may be considered as equipment Service knowledge cartridge (explained by way of subsequent FIGS.).

In accordance with various embodiments of the present disclosure, any of the service record identification 428, the billing NLP and ML model 424, and the plan coverage matching engine 426, the knowledge cartridge model 430, and the billable-non-billable validation 432 may process the data from the knowledge database 404, the process knowledge database 412, and the input 402 to generate the output 418. For the sake of brevity and technical clarity the "artificial intelligence pipeline 410" may be used hereinafter to refer to any of the service record identification 428, the billing NLP and ML model 424, and the plan coverage matching engine 426, the knowledge cartridge model 430, and the billable-non-billable validation 432. The billing NLP and ML model 424 may classify the various products, components, and services as "non-billable" or "billable" based on various clients, client invoice plans, client subscription plans, client payment plans, client requirements, technical expertise, required time duration associated with various products, components, and services, and the like. The "non-billable" products, components, and services may be exempt from the accrual of any financial consideration. The "billable" products, components, and services may lead to the accrual of financial consideration. The billing NLP and ML model 424 may classify a given service request (SR) as "billable" or "non-billable".

The artificial intelligence pipeline 410 may codify selection rules 224. The artificial intelligence pipeline 410 may identify customer contracts/bill plans, site instructions, missing line items. The artificial intelligence pipeline 410 may perform a billing validation. The artificial intelligence pipeline 410 may transform rules present in the plain text form of bill plans into if-then-else selection rules 224 for each customer. The artificial intelligence pipeline 410 may transform site instructions into if-then-else selection rules 224 used later for billing validation for each customer. The artificial intelligence pipeline 410 may obtain selection rules 224 from the rules and exceptions component 416 and codify them for identifying missing chargeable line items. The artificial intelligence pipeline 410 may obtain selection rules 224 from and codify them for validating chargeable billing amounts.

The artificial intelligence pipeline 410 may perform a representation of customer contracts and the selection rules 224. The artificial intelligence pipeline 410 may represent customer bill plans/contracts in hierarchical JSON formats. The artificial intelligence pipeline 410 The customer bill plans/contracts may include customer-device-part name-service-bill plan concepts for the general, specialized and special customers. The artificial intelligence pipeline 410 may represent selection rules 224 in the if-then-else JSON formats. The selection rules 224 may be related to contracts, plans, billing validation, missing line items, and the like. The artificial intelligence pipeline 410 may store all these structured contracts and selection rules 224 JSONs in a MongoDB™ for effective matching and retrieval.

The artificial intelligence pipeline 410 may perform retrieval of customer contracts and the selection rules 224. In an example, the artificial intelligence pipeline 410 may perform the retrieval of client contracts and the selection rules 224 for a given set of the service record notes, client entitlement description, and client address inputs. The artificial intelligence pipeline 410 may identify the geographical region of the client from the client address information and pick the relevant client name. After identification of the client name, the artificial intelligence pipeline 410 may extract the device and plan code from the entitlement description. The artificial intelligence pipeline 410 may identify the relevant client contract/bill plan document based on the client name, device and plan. The artificial intelligence pipeline 410 may similarly identify the client-specific site instructions for the identified client. The artificial intelligence pipeline 410 may retrieve the client-specific selection rules 224 based on client-device-plan combination. The artificial intelligence pipeline 410 may perform fuzzy and full matching with algorithms such as cosine similarity and word2vec™ similarity measure for retrieving contracts information, site instructions from the MongoDB™.

The artificial intelligence pipeline 410 may uncover missing chargeable line items. In accordance with various embodiments of the present disclosure, the artificial intelligence pipeline 410 may identify missing and matching chargeable line items such as part names and services. The artificial intelligence pipeline 410 may identify the list of service names, part/component names, quantity, travel, labor, hours of coverage items, and the like from the given chargeable line items obtained from the customer profile and billed plan matrix 414 for a given customer-device-plan for billable/non-billable cases. The artificial intelligence pipeline 410 may identify the list of services, part names, quantities from the given input 402 for a given client from the knowledge cartridge model 430. The artificial intelligence pipeline 410 may identify whether extracted services, part names may be billable or not covered from the customer billable plan and compile a list of services, part names, and quantities that may be billable. The artificial intelligence pipeline 410 may identify corresponding labor, travel, hours of coverage from the customer bill plans and terms and conditions if these may not be covered and may be billable. The artificial intelligence pipeline 410 may reconcile the items identified as mentioned above and identify matching line items and missing line items.

The artificial intelligence pipeline 410 may perform a validation of potential billing items. As mentioned above, the artificial intelligence pipeline 410 may determine all the billable products, components, and services. The artificial intelligence pipeline 410 may perform validation for the identification of billable products, components, and services. The validation may prevent any revenue leakage that may occur due to the identification of a set of products, components, and services as non-billable. The validation may assist with client management by preventing the identification of a set of products, components, and services as billable when they may be non-billable as per the customer profile and billed plan matrix 414. The artificial intelligence pipeline 410 may verify if the products, components, and services mentioned in the chargeable line items matches identified above with the items in the customer profile and billed plan matrix 414. The validation may include checking if the identification of billable items may match and then identify the type of service. In accordance with various embodiments of the present disclosure, the type of service may be a repair category, an installation category, and a replacement category. In an example, the type of service may be the replacement category service then the artificial intelligence pipeline 410 may check the quantities mentioned in the billable items that may be matching with the quantities that may be extracted from the input 402.

In an example, if the identification of billable items may match, the artificial intelligence pipeline 410 may extract the part/component numbers and order numbers from the customer bill plan from the customer profile and billed plan matrix 414 and from the knowledge database 404. The artificial intelligence pipeline 410 may retrieve the prices for the products, components, and services from the customer bill plan then perform the billing computation else, the artificial intelligence pipeline 410 may park the identification of billable items as 'quantities not matching'. In an example, if the type of service may be installation category or repair category then the validation may check whether part/component may be covered from the customer profile and billed plan matrix 414, if it is not covered the artificial intelligence pipeline 410 may perform the billing computation. The artificial intelligence pipeline 410 may verify if the labor charges associated with resolving a problem for a client may be covered as non-billable or billable from the customer profile and billed plan matrix 414. The artificial intelligence pipeline 410 may then check if hours of coverage may be extracted and then perform the billing computation. In an example, if 'hours of labor charge coverage' may not be available, the system may check if default may be covered. The artificial intelligence pipeline 410 may perform the billing computation thereafter. The artificial intelligence pipeline 410 may verify if the travel expenses associated with resolving any problem request for a client may be billable from the customer profile and billed plan matrix 414. The artificial intelligence pipeline 410 may perform the billing computation thereafter.

The artificial intelligence pipeline 410 may estimate the billing amount using billing contracts. The billing amount computation/adjustment and verification may include the application of the selection rules 224. In an example, if the part/component may be replaced then the artificial intelligence pipeline 410 may compute the total billing amount for every line item of this service type. In an example, the component billing amount may be equal to the number of products or components replaced multiplied by price for each of the products or components. In an example, if a part/component may be serviced then the artificial intelligence pipeline 410 may compute the total bill amount accordingly. The service billing amount may be equal to the service billing amount mentioned in the client contract. The artificial intelligence pipeline 410 may compute the travel charge amount. The artificial intelligence pipeline 410 may compute the labor charge amount based on the number of hours. The artificial intelligence pipeline 410 may apply all relevant terms and conditions/exclusions/inclusions from the selection rules 224 on the computations mentioned above based on customer-device-plan type. For example, for a particular client labor might be already included in a specified service. In this case, the artificial intelligence pipeline 410 may adjust the already quoted amount in the chargeable line items. In an example, site instructions may need to be verified on a component or a service, the artificial intelligence pipeline 410 may mark the same accordingly in the output 418. The artificial intelligence pipeline 410 may cross verify the total amount computed with the amount mentioned in the client entitlement description. The artificial intelligence pipeline 410 may apply selection rules 224 on the computed amount and make relevant decisions.

The artificial intelligence pipeline 410 may perform validation through an intermediate agent. The intermediate agent may be a team based around the geographical location of a client. The artificial intelligence pipeline 410 may route a problem request to a local team for review based on selection rules 224 and missing information as identified above. In an example, if any line item such a service name, a product name or a component name may be missing, the artificial intelligence pipeline 410 may route it to the team based around the geographical location of a client for review. In an example, if the total billing amount may meet certain criteria or threshold according to the selection rules 224, then the artificial intelligence pipeline 410 may route it to the team based around the geographical location of a client for review. In an example, if line items and amounts for the services or components or products may not be mentioned in the notes then the artificial intelligence pipeline 410 may route it to the team based around the geographical location of a client for review.

The artificial intelligence pipeline 410 may perform a validation of billing decisions using the selection rules 224. The artificial intelligence pipeline 410 may perform a correction of billable/non-billable/review pre-populated entries. In an example, the artificial intelligence pipeline 410 may correct the pre-populated service record note classification as following in a three (3) way validation system. If populated category may be non-billable and the prediction from the NLP model and ML 424 may be 'billable' and billing validation output may be 'billable' then the final category may be designated as 'billable' for an associated product component or service. If populated category may be non-billable and the prediction from the billing NLP model and ML 424 may be 'non-billable' but billing validation output may be 'billable' then the final category may be designated as 'billable' for an associated product component or service. If there may be a 'missing information' identification as mentioned above and the billing amounts in client entitlement description and computed amounts may not match and populated category may be 'billable', then the artificial intelligence pipeline 410 may designate the final classification as 'sent to local review category' for an associated product component or service. In an example, if there may be no missing information and all three categories may agree as either billable or non-billable, then the artificial intelligence pipeline 410 may consider the agreed category as final classification.

The artificial intelligence pipeline 410 may generate a summary of billing notes and explainable visualization using the knowledge tree 240. The artificial intelligence pipeline 410 may generate invoice billing notes, chargeable line items, amount entries as text summary using Natural-language generation (NLG approach). The artificial intelligence pipeline 410 may extract all the key parts of products and services and corresponding billing notes structure from the historical billing notes. The artificial intelligence pipeline 410 may employ the state of the art deep learning (DL) approach such as Generative adversarial networks (GANs) and learn the sentence expressions. The artificial intelligence pipeline 410 may generate invoice billing notes for a given customer from the technician closing notes to include the parts, services, quantities, travel, and labor hours and services. The artificial intelligence pipeline 410 may generate invoice billing notes for a given customer from the technician closing notes to include the problem resolution that may be mentioned in the closing notes. The artificial intelligence pipeline 410 may generate an explainable knowledge sub-graph such as the knowledge tree 240 of the fine-grained billable components, services, and billing contracts with the selection rules 224 visualizations (illustrated by way of subsequent FIGS.). The explainable knowledge sub-graph may be generated from the fine-grained product services and components that are extracted compile the sub-graph of the query. The explainable knowledge sub-graph may be generated by incorporating all the expanded components and services as part of a query-graph for better matching compiled using BERT/ELMO in house embeddings of the vocabulary of the product. The explainable knowledge sub-graph may be generated from extract the matching sub-graph from the product knowledge graph using the query sub-graph using the query method (illustrated by way of subsequent FIGS.). The extracted sub-graph may be used by the technicians for better billing decisions and problem resolutions.

FIG. 5 illustrates a process flow diagram 500 for building the billing NLP and ML model 424 for record identification and generation using the record generation system 110, according to an example embodiment of the present disclosure. For the sake of brevity and technical clarity, the components described above for the system 110 may be referred herein.

The process flow diagram 500 may include a data gathering 502. The data gathering 502 may include gathering historical data for processing a record generation requirement 202. The data gathering 502 may include data such as for example, "Data—January-December 2018, January-May 2019, Qc data, Revenue leek Total: 2854730 SR Notes, 10.9% billable, xx SR notes from QC data, yy SR notes from Revenue leek data". The process flow diagram 500 may further include a data skewness and variance analysis 504. The data skewness and variance analysis 504 may include that the observed raw data may be left-skewed with respect to client plan code, billable/non-billable and long tail in client wise analysis. For the whole of the billing NLP and ML model 424 only the top 3 devices contributing to 99% of the volume may be considered for the scope. The process flow diagram 500 may further include a balancing 506. The balancing 506 may include balancing data consideration for training the prediction model and testing. The balancing 506 may include device-based stratified by plan code sampling of data. The process flow diagram 500 may further include a data conversion 508. The data conversion 508 may include extraction of products, service and components data from the service record notes such as the input 402. The process flow diagram 500 may further include a semi-structured text data conversion 510. semi-structured text data conversion 510 may include the client plan type, brand & service extraction from client entitlement description. The process flow diagram 500 may include a multiple classification prediction model building 512. The multiple classification prediction model building 512 may include building multiple classification models such as logistic regression, random forest, decision tree and Support Vector Machine (SVM) may be built one each for the top 3 devices—as mentioned above. The process flow diagram 500 may include a choosing step 514. The choosing step 514 may include choosing the best prediction model from the ones built by the multiple classification prediction model building 512. In an example, the SVM may be found to be providing the best results compared to others, wherein the performance was based on an 80:20 ratio of the data. The process flow diagram 500 may include a testing 516. The testing 516 may include testing the best model chosen by the choosing 514 on multiple data sets. The process flow diagram 500 may include a reporting 518. The reporting 518 may include reporting the test data result analysis. The reporting 518 may include an accuracy result, impact of it on quality checks (QC) and revenue leek data. The reporting 518 may check for false-negative impact on QC and revenue leek data. The reporting 518 may ascertain these results on revenue impact, bill amount impact, and the like. The false-negative may be predicting a true billable service record as non-billable. The false-positive may be predicting true non-billable as billable.

Figure 6:
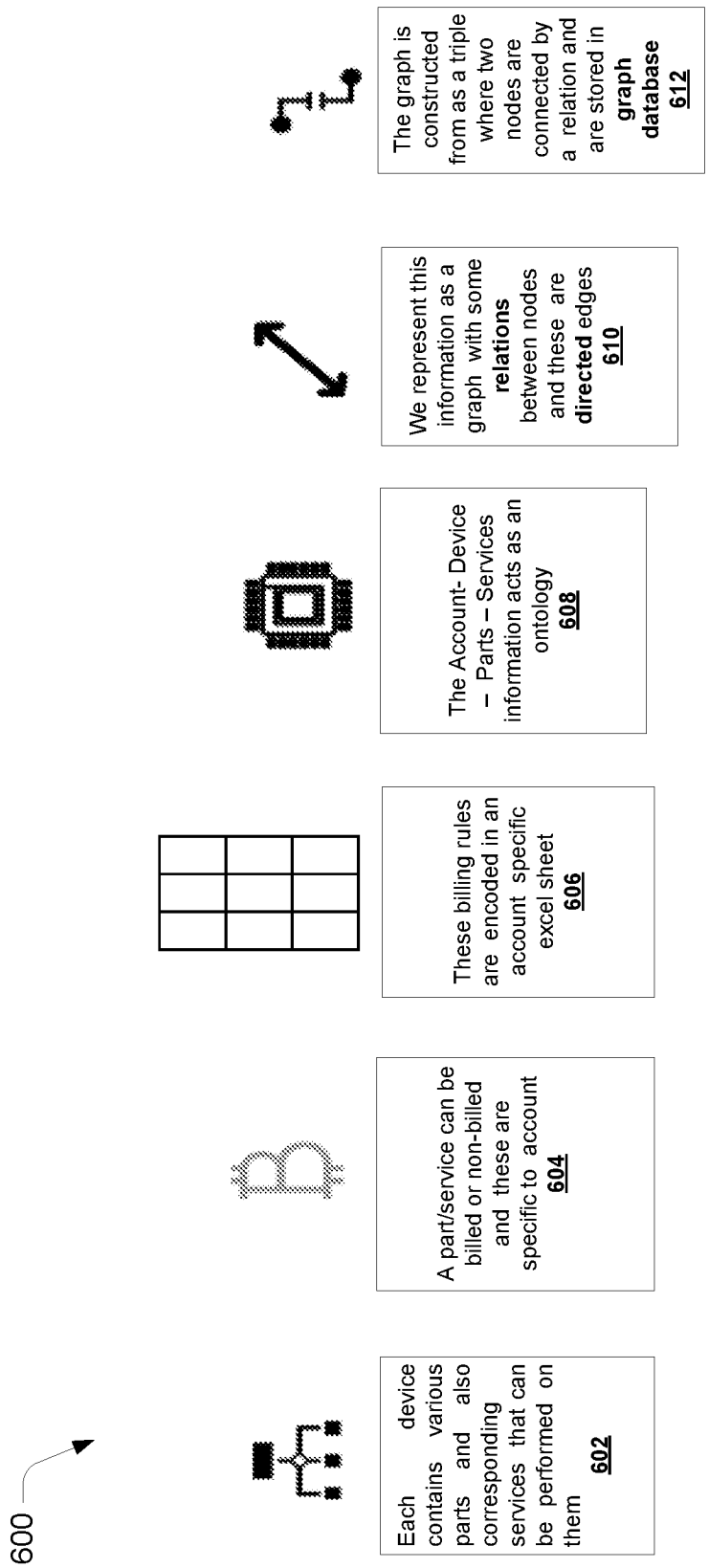
FIG. 6 illustrates a pictorial representation of symbols used in a knowledge graph created by a record generation system, according to an example embodiment of the present disclosure.

FIG. 6 illustrates a pictorial representation 600 of symbols used in the knowledge tree 240 created by the record generation system 110, according to an example embodiment of the present disclosure. For the sake of brevity and technical clarity, the components described above for the system 110 may be referred herein. The pictorial representation 600 may include a symbol 602 denoting various devices containing various parts and also corresponding services that may be performed on them. The pictorial representation 600 may include a symbol 604 denoting a part/service that may be billed or non-billed specific to a client account. The pictorial representation 600 may include a symbol 606 denoting selection rules 224 that may be encoded in an account-specific excel sheet. The pictorial representation 600 may include a symbol 608 denoting the account-device—parts—services information acts as an ontology. The pictorial representation 600 may include a symbol 610 denoting information as a graph with some relations between nodes and directed edges. The pictorial representation 600 may include a symbol 612 denoting the graph may be constructed from as a triple where two nodes may be connected by relation and may be stored in a graph database.

FIG. 7A illustrates a pictorial representation 700A of a product knowledge tree 702 and a services knowledge tree 704 created by the record generation system 110, according to an example embodiment of the present disclosure. The product knowledge tree 702, and the services knowledge tree 704 may be the same as the knowledge tree 240 described above. For the sake of brevity and technical clarity, the components described above for the system 110 may be referred herein. The pictorial representation 700A may illustrate a product and services knowledge tree representation. The pictorial representation 700A may include various nodes in the graph for account name, device, part, concepts, and services. The product knowledge tree 702, and the services knowledge tree 704 as illustrated in the pictorial representation 700A may include relations such as "OPERATES", "HAS_A", "IS_A", "ACTION" (also illustrated by way of FIGS. 12-14). The edges illustrated in the pictorial representation 700A may describe the relationship between the nodes. For example, an Account operates two devices—ATM and VAULT. This is represented as illustrated in the pictorial representation 700A as "Vault", "ATM". In an example, each device may have some parts/concepts. For example, the "ATM" may have a cassette, a cassette lid, and the like as illustrated in the pictorial representation 700A. The system 110 may extract various relationships between various products, components, and services for various clients from the customer profile and bill plan matrix 414. In an example, the hypernym and hyponyms information may be extracted from the bill plan matrix and stored with an "IS_A" relations.

Figure 7B:
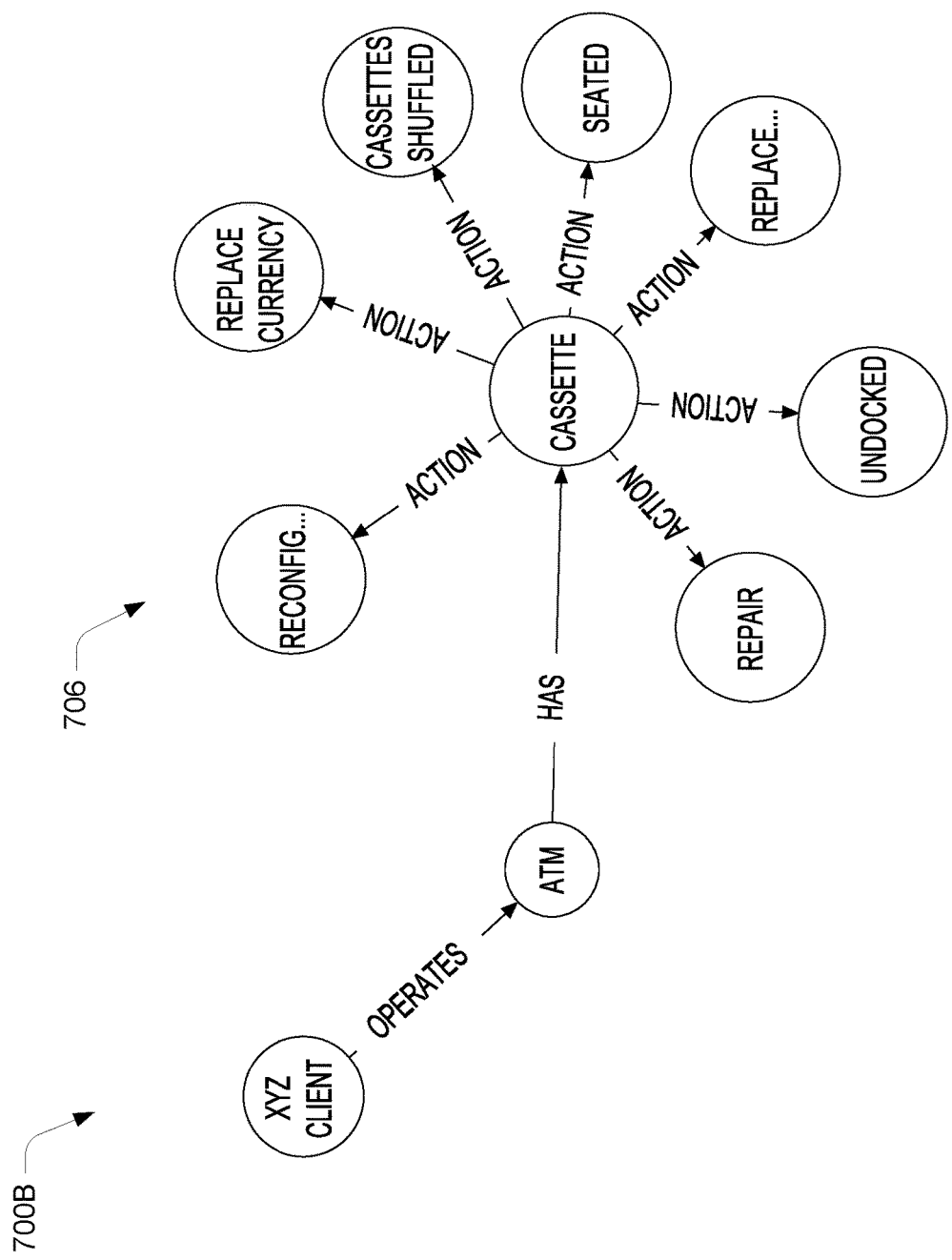
FIG. 7B illustrates a pictorial representation of a querying process deployed by the services knowledge graph created by a record generation system, according to an example embodiment of the present disclosure.

FIG. 7B illustrates a pictorial representation 700B of a querying process 706 knowledge tree representation deployed by the services the knowledge tree 240 created by the record generation system 110, according to an example embodiment of the present disclosure. For the sake of brevity and technical clarity, the components described above for the system 110 may be referred herein. The querying process may include obtaining information about the various services that are performed on a device. For example, the cassette may have a replacement, repair, reconfiguration setting as some of the actions.

Figure 7C:
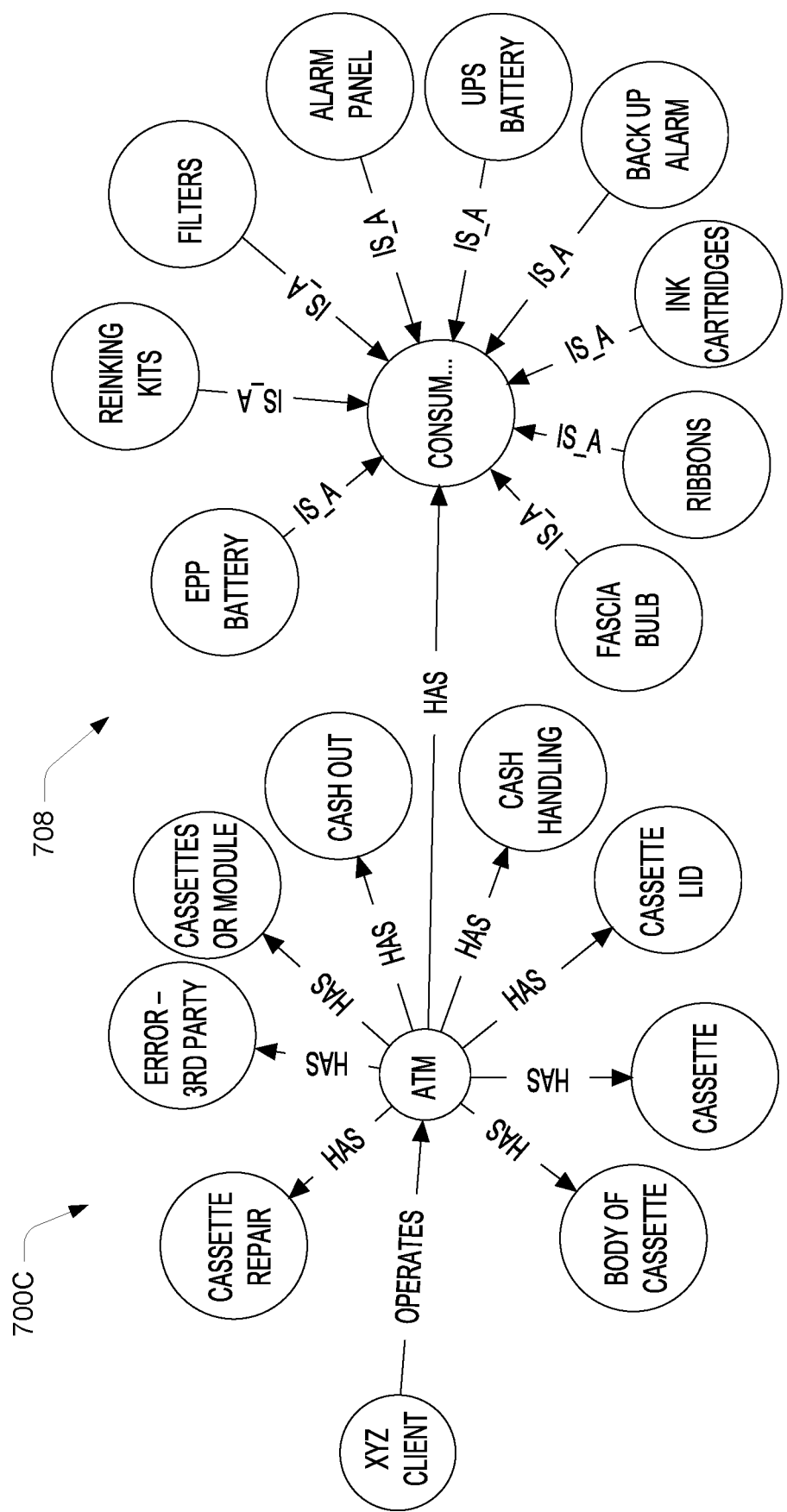
FIG. 7C illustrates a pictorial representation of a querying process deployed by the services knowledge graph created by a record generation system, according to an example embodiment of the present disclosure.

FIG. 7C illustrates a pictorial representation 700C of a knowledge tree 708 created by the record generation system 110, according to an example embodiment of the present disclosure. The knowledge tree 708 may be the same as the knowledge tree 240 described above. For the sake of brevity and technical clarity, the components described above for the system 110 may be referred herein. The knowledge tree 708 may be created by amalgamating the product knowledge tree 702, and the services knowledge tree 704 as illustrated in the pictorial representation 700A and the querying process 706 knowledge tree representation as illustrated in the pictorial representation 700B. The knowledge tree 708 may depict the relationship between various products such as "ATM", their subcomponents, and associated actions and services.

Figure 8:
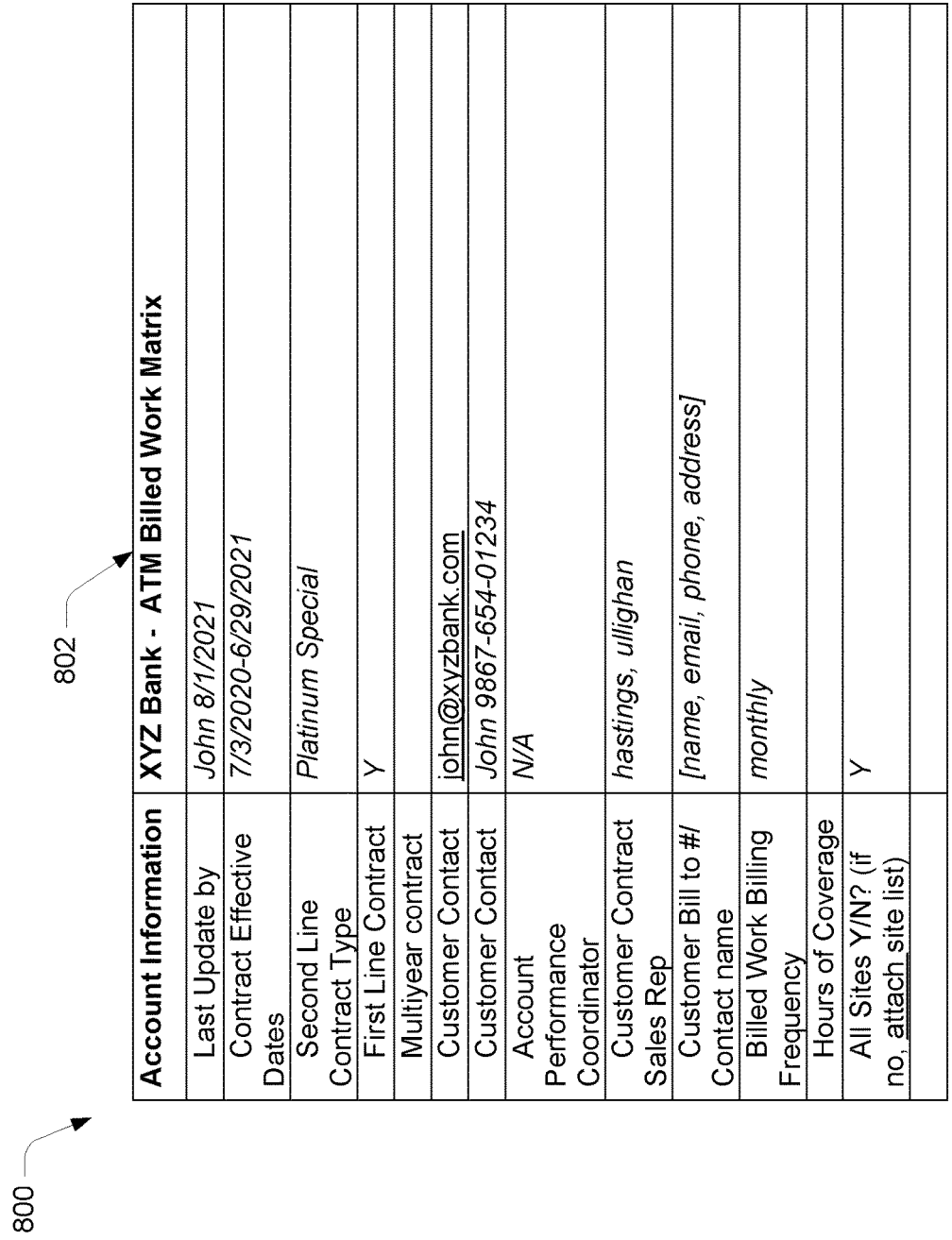
FIG. 8 illustrates a pictorial representation of a part of an exemplary data comprising an account information used for a record generation process by a record generation system, according to an example embodiment of the present disclosure.

FIGS. 8-14 illustrate an exemplary embodiment of the system 110 and may be described in continuation. FIG. 8 illustrates a pictorial representation 800 of a table 802 comprising a part of an exemplary data illustrating account information used for a record generation process by the record generation system 110, according to an example embodiment of the present disclosure. The account information may be related to a client of an organization. For the sake of brevity and technical clarity, the components described above for the system 110 may be referred herein. FIG. 9 illustrates a part of the exemplary data comprising information on various products, components, and services associated with the client as mentioned by way of FIG. 8. FIG. 9 illustrates a pictorial representation 900 of a table 902 comprising apart of the exemplary data used for a record generation process by the record generation system 110, according to an example embodiment of the present disclosure. For the sake of brevity and technical clarity, the components described above for the system 110 may be referred herein. The data illustrated by the pictorial representation 800, and the pictorial representation 900 may be sorted by the system 110 for creating the record corpus 208. The system 110 may perform a problem expression categorization from SR notes.

In an example, the system 110 may obtain an input "Human supervised historical data of 2 years related to 1000 customers and various devices (products) with billable decisions and amounts". The system 110 may test the input from a given problem expression. The system 110 may employ the classical Machine Learning (ML) and Deep Learning (DL) based classifiers such as the ensemble of SVM, Random forests and the Convolutional Layer Neural Network (CNN). The system 110 may use various features such as client entitlement descriptions, plan codes and NLP features such as product tags, lemmatized vocabulary, part names and services for billability categorization for creating the algorithms such as the billing NLP and ML model 424 to predict the billable decisions as 'billable', 'non-billable' and 'need further review. In an example, the system 110 may provide an output to be "billable" with a confidence of 98%. The system 110 may curate the billable decision by augmenting selection rules 224 and customer billing contracts for curating model predictions. Customer-specific selection rules 224 may be employed on top of the model predictions based on the additional features such as 'plan codes' and SR types to improve the model predicted results. For example, if SR-Type may be 'trouble-call' then a decision may be changed to billable. If the billing amount may be mentioned in the problem expression by technician but model prediction is 'non-billable' change it to 'billable'. Some of the billing decisions may be reversed based on customer billing contract coverage. If some services mentioned in the problem request may already be covered in the bill plan, then the decision should be 'non-billable' though the model may predict it as 'billable' with high-confidence.

For example, the SR notes may include a record identification number such as "SR #: 1-ABCDEF" that may be unique a problem. The SR notes may include information about a device names such as "TAB/ATM" that may be associated with the problem mentioned in the SR notes. The SR Notes may include a phrase "On arrival esc cassette assay was showing undocked. It was actually docked by CV but switch was not making good contact. I repaired and adjusted docking switch and tested. All tested good. Did a good live cash deposit. Atm is open with no faults. Due to stuck on two problem calls and it being too late and unsafe late at night I will run call tomorrow morning. A representative at fcnb is aware. **OVVA upon remoting, locked the screen. The atm is online and in service with cash acceptor fatal. ran diagnostics on cash acceptor, result: failed. entered into vdm, ran self, reset test on ena, found device error. ran sensor state test on ena, passed. rebooted the atm. after reboot, atm is online and in service with cash acceptor fatal. upon exit, atm is online and in service with cash acceptor fatal. back to consumer screen. unlocked the screen".

In an example, the system 110 may obtain an input "Corpus of historical problem requests and chargeable parts and services sampled by customers, devices and SR types". The system 110 may test the problem request. The system 110 may extract parts, services, devices and customers compiled from bill plans and online sources. The system 110 may employ the classical ML and DL-based sequential labeling algorithms such as conditional random field (CRF), Bi-directional long short term memory (Bi-LSTM) for the generation of the billing NLP and ML model 424. The system 110 may deploy a zero-shot learning algorithm on the supervised data shown in slide 40 to learn device-specific parts, services, and other information. The system 110 may learn the various part and services specific embeddings by employing word2vec™ and ELMO/BERT based semantic embeddings for better extraction of parts and services from the historical corpus. The learned model may be perused to infer the device-specific parts and services on the given test input. The output from the learned model may be extracted from parts and services. An exemplary output may include various parts such as 'docking switch', 'the screen', 'diagnostics on cash acceptor', 'vdm', 'on ena', 'device error', 'sensor state test', 'the screen', and the like. The exemplary output may include various services such as 'tested', 'locked', 'tested', 'found', 'rebooted', 'unlocked', 'entered into', 'repaired', 'reset test', 'adjusted', 'ran', 'repaired', 'adjusted', 'tested', 'tested', 'locked', 'ran', 'entered into', 'ran', 'reset test', 'found', 'ran', 'rebooted', 'unlocked', and the like.

FIG. 10 illustrates a pictorial representation 1000 of a plurality of data domains 1002 used for a record generation process by the record generation system 110, according to an example embodiment of the present disclosure. The plurality of data domains 1002 may be similar to the plurality of data domains 212 described above. For the sake of brevity and technical clarity, the components described above for the system 110 may be referred herein. For example, the pictorial representation 1000 illustrates "ATM" parts compiled from the plurality of data sources 206 such as various online sources and customer billing contract plans for a customer 'XYZ'.

Figure 11:
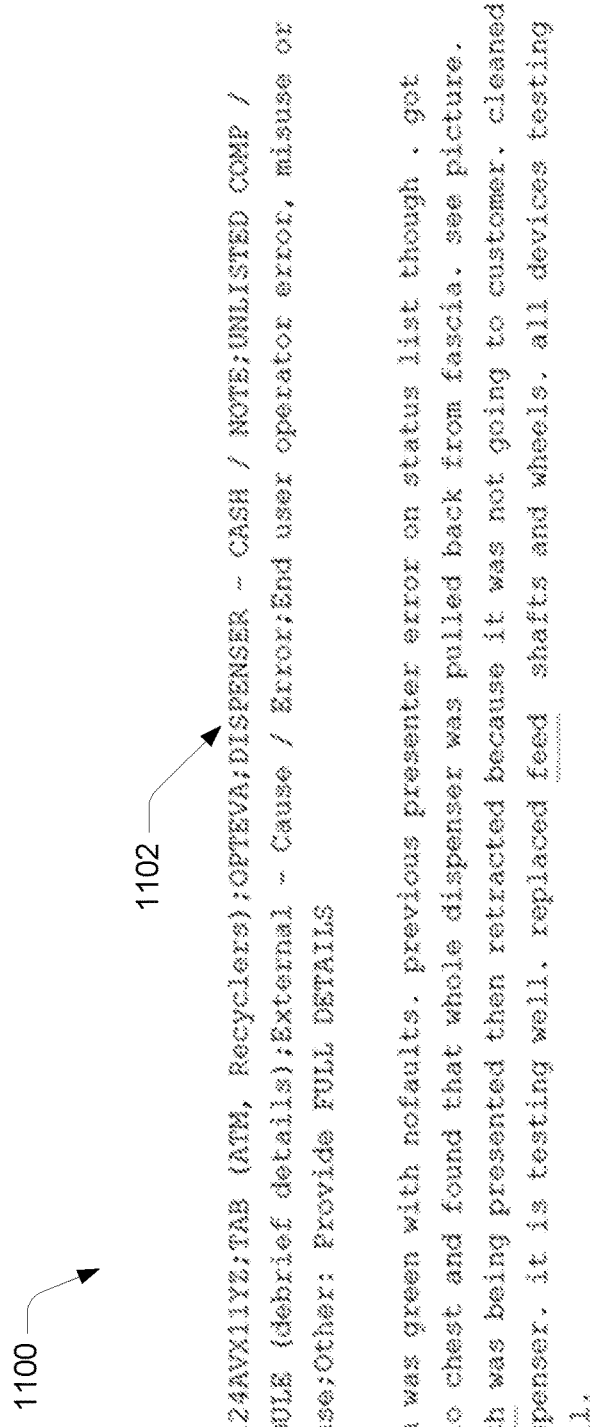
FIG. 11 illustrates a pictorial representation of annotation of an exemplary problem request used for a record generation process by a record generation system, according to an example embodiment of the present disclosure.

FIG. 11 illustrates a pictorial representation 1100 of annotation of an exemplary problem request 1102 used for a record generation process by the record generation system 110, according to an example embodiment of the present disclosure. For the sake of brevity and technical clarity, the components described above for the system 110 may be referred herein. The pictorial representation 1100 may illustrate an exemplary data set that may be deployed under human supervision for training data preparation for automated product knowledge extraction. For example, the training data may be used for problem expression (SR) annotation.

Figure 12:
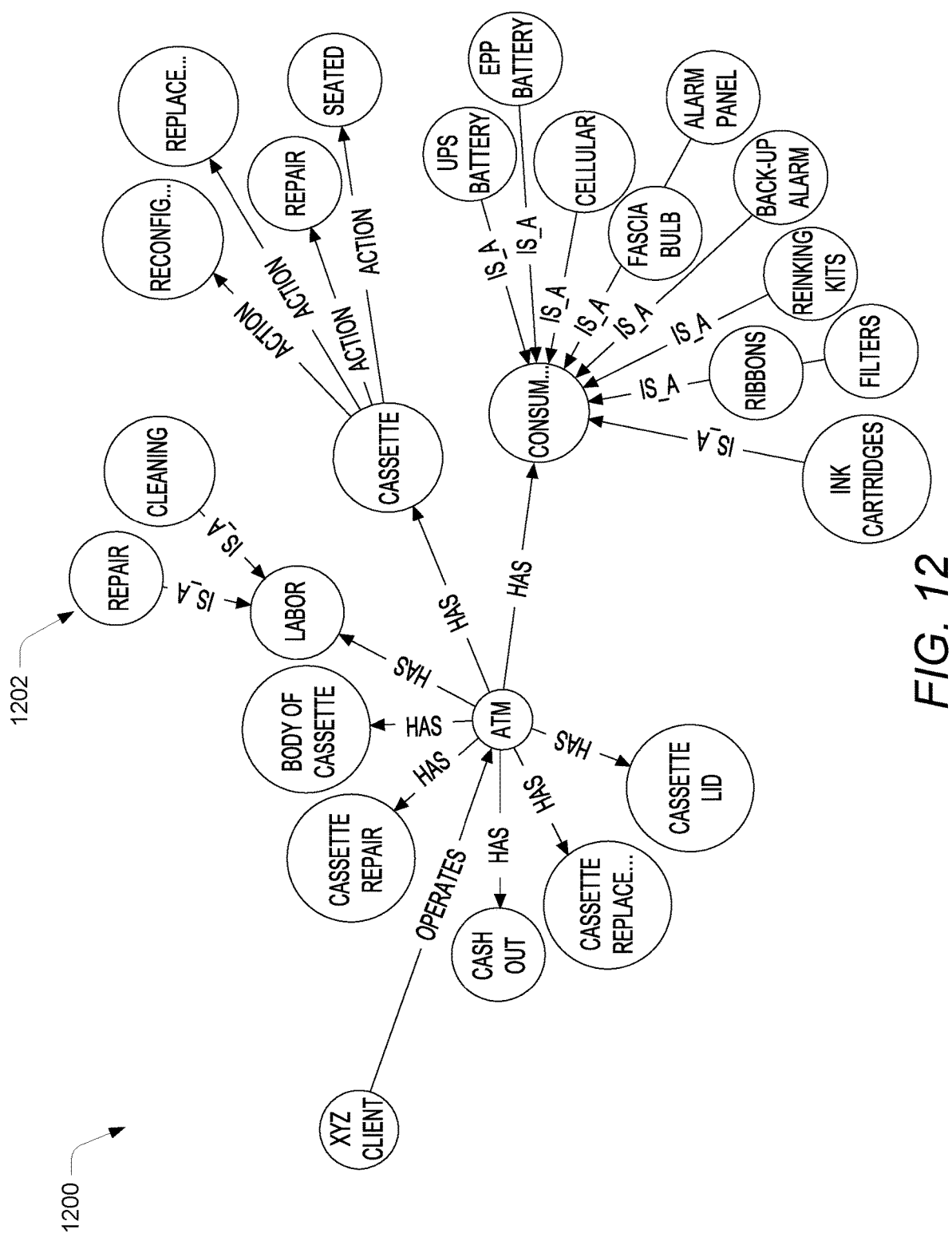
FIG. 12 illustrates a pictorial representation of a knowledge graph created by a record generation system, according to an example embodiment of the present disclosure.

FIG. 12 illustrates a pictorial representation 1200 of a knowledge tree 1202 created by the record generation system 110, according to an example embodiment of the present disclosure. The knowledge tree 1202 may be an exemplary embodiment of the knowledge tree 240 described above. For the sake of brevity and technical clarity, the components described above for the system 110 may be referred herein. The knowledge tree 240 may be compiled from the customer billing plan contract related to services and components. The system 110 may learn the semantic variations of vocabulary such as parts and services from the historical corpus using deep-learning-based external knowledge bases such as Word2vec™ and BERT/ELMO embeddings. The system 110 may use these embeddings to compile synonyms, hypernyms, hyponyms related concepts for the extracted knowledge. For example, 'Wiped up' service may be mapped to 'clean' service using the learned embeddings from external knowledge bases and then 'clean' may be used to match with the customer profile and bill plan matrix 414. The customer profile and bill plan matrix 414 may include the bill plan matrix parts and services. For example, the concept 'labor' may be formed out of 'clean', 'repair', 'wipe' synonyms into 'hypemym' relations. The system 110 may deploy these methods to enrich the knowledge tree 240 with variations of parts and services to cover the exhaustive vocabulary and constructed the knowledge tree 240 as illustrated in the pictorial representation 1200. The system 110 may use the symbols mentioned by way of the pictorial representation 600 to build the connected knowledge tree 240 for the technical products. The pictorial representation 1200 may illustrate a customer-product knowledge graph. In an example, the billing amount is computed using the matched parts and services against the billing customer contract plan as explained above. In an example, for each matching parts and services, the corresponding value from the bill plan matrix may be computed. For example, "replaced the paper", "wiped the screen" and labor will be matched for the customer 'XYZ' and 'Device' and the billing amount may be estimated as described by way of FIG. 4B. In an example, the billing amount may be calculated as for example, 25$ billing amount.

The system 110 may compile billable notes/summary in a textual format and provide an explainable visualization in the form of the knowledge tree 240. The system may provide an explainable visualization by employing the advanced deep learning methods such as Generative adverbial networks (GANs) on the supervised historical corpus of previous billing notes, the summary can be generated using the learned model. The system 110 may generate invoice billing notes for the given customer from the technician to include the parts, services, quantities, travel, and labor hours and services, include the resolution that may be mentioned in the closing notes, and include the billing amount. In an example, the summary generated as "'Cassette communication error' is reported, Replaced ink ribbon on MMA. Added paper to receipt printer. Cleaned. The chargeable amount is 25$'".

An exemplary workflow of End-to-End billing service may include an output that may be by deploying the system 110. The output may include, for example, a table such as presented herein.

---

Billable Decision: Billable, confidence: 98%
Billing Amount: $25
Potential billing components and Services
Parts/components: 'DSA', 'ink ribbon', 'printing test', 'diagnostic', 'MMA', 'paper to receipt printer', 'atm exterior', 'Audio ports'
Services: 'Entered DSA', 'Exited DSA', 'Ran printing test', 'Added paper', 'Replaced ink ribbon on MMA', Wiped down ATM exterior
Billable Notes Summary: 'Cassette communication error' is reported, Replaced ink ribbon on MMA. Added paper to receipt printer. Cleaned. The chargeable amount is 25$'.
Visualization of billing decision: illustrated by the knowledge tree 240

Figure 13:
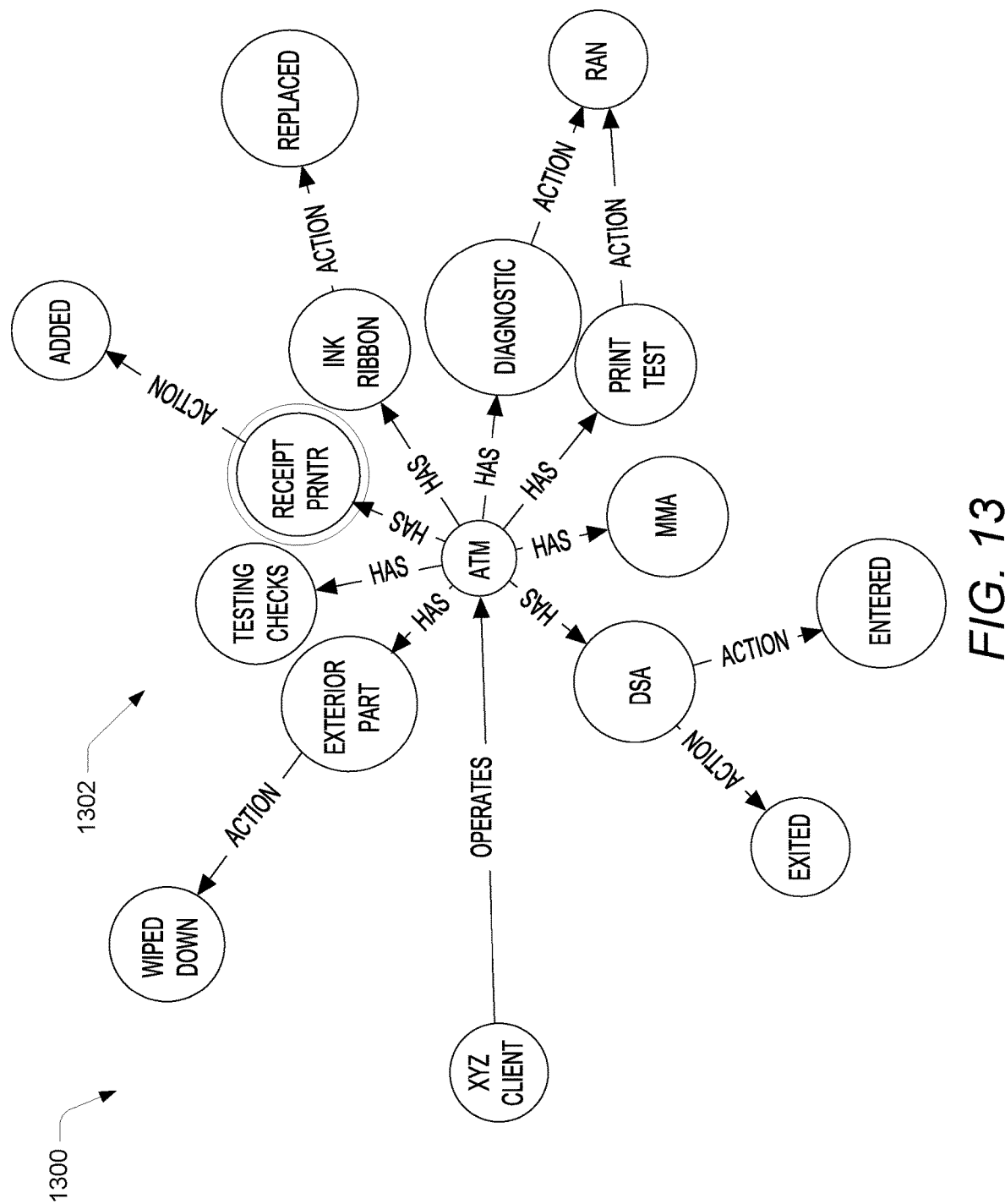
FIG. 13 illustrates a pictorial representation of a querying process deployed by a knowledge graph created by a record generation system, according to an example embodiment of the present disclosure.

FIG. 13 illustrates a pictorial representation 1300 of an exemplary embodiment of a querying process 1302 deployed by the knowledge tree 240 created by the record generation system 110, according to an example embodiment of the present disclosure. For the sake of brevity and technical clarity, the components described above for the system 110 may be referred herein. The querying process may include enriching the knowledge tree 240 illustrated by the pictorial representation 1200 using all the semantic variations such as synonyms learned from the external knowledge bases. This may help in capturing all variations that may be mentioned in the customer billing plan contract matrix for determining the billing amount. The pictorial representation 1300 may illustrate a query sub-graph (also mentioned by FIG. 7B).

Figure 14:
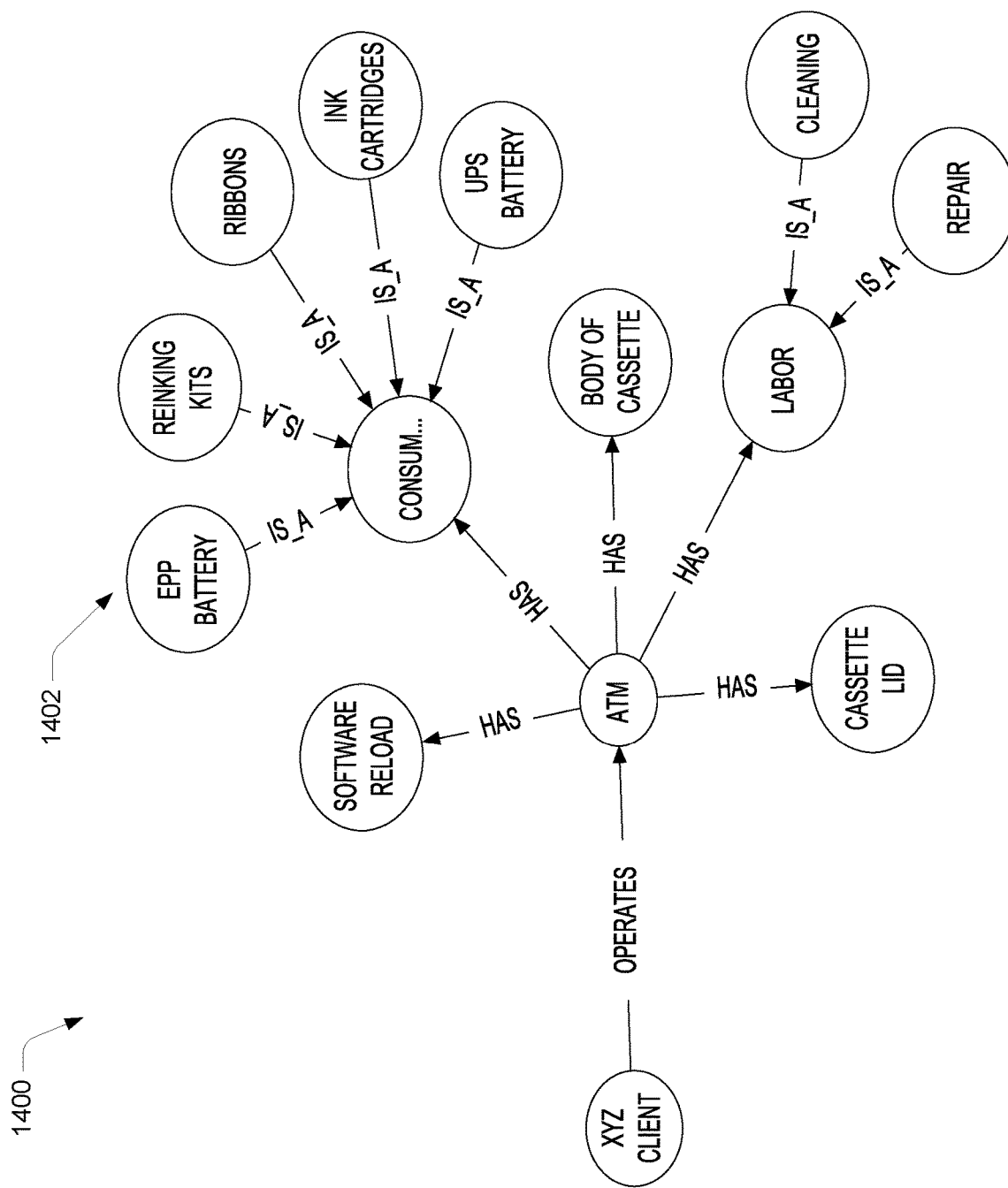
FIG. 14 illustrates a pictorial representation of a result from the querying process illustrated by way of FIG. 13 created by a record generation system, according to an example embodiment of the present disclosure.

FIG. 14 illustrates a pictorial representation 1400 of a result 1402 from the querying process 1302 illustrated by way of FIG. 13 created by the record generation system 110, according to an example embodiment of the present disclosure. For the sake of brevity and technical clarity, the components described above for the system 110 may be referred herein. The knowledge tree 240 illustrated by way of pictorial representation 1400 may be a result after the projecting query sub-graph as illustrated by FIG. 13 on to the customer-product knowledge graph illustrated by the pictorial representation 1200.

Figure 15:
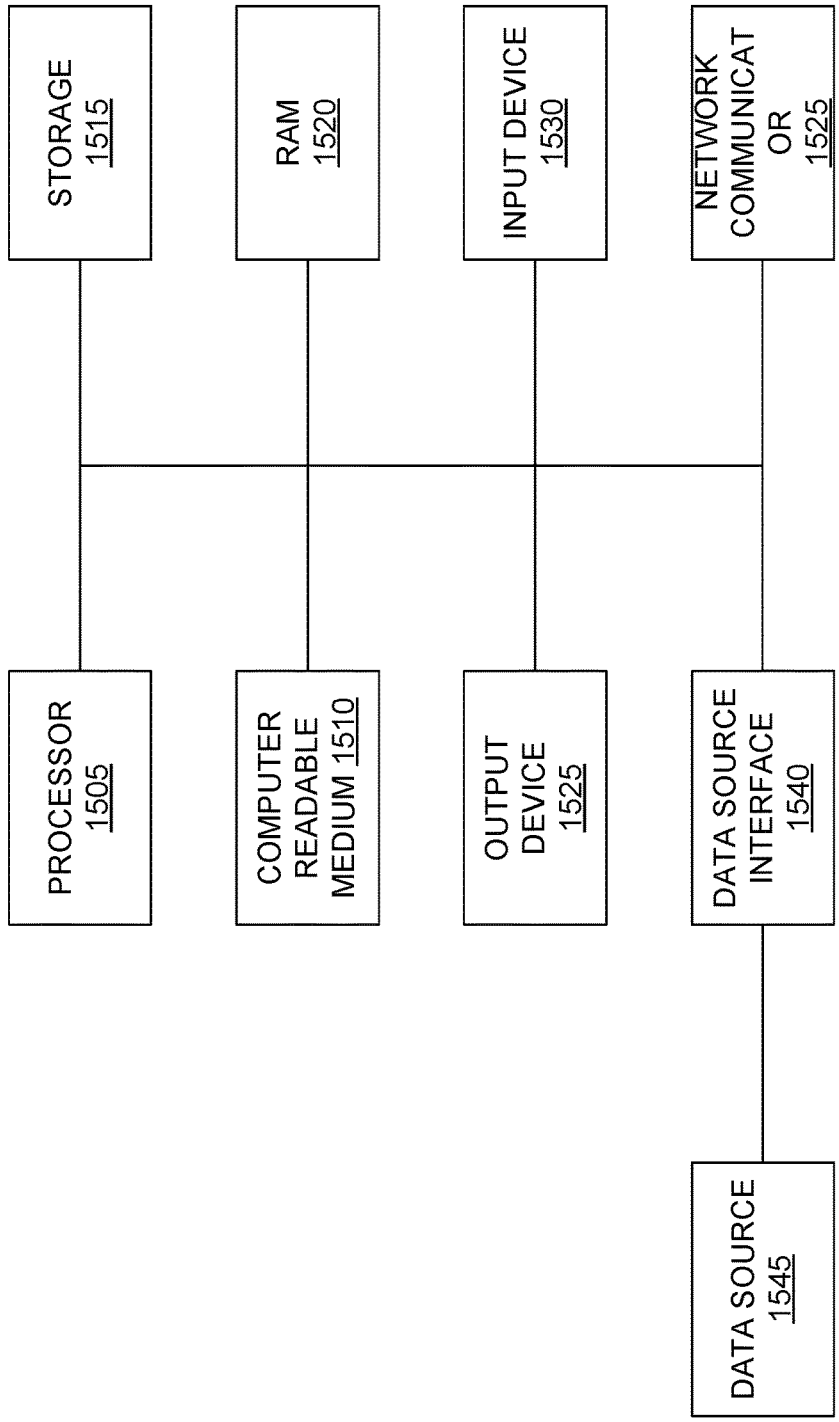
FIG. 15 illustrates a hardware platform for the implementation of a record generation system, according to an example embodiment of the present disclosure.

FIG. 15 illustrates a hardware platform 1500 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1500. The hardware platform 1500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 15, the hardware platform 1500 may be a computer system 1500 that may be used with the examples described herein. The computer system 1500 may represent a computational platform that includes components that may be in a server or another computer system. The computer system 1500 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1500 may include a processor 150 5 that executes software instructions or code stored on a non-transitory computer-readable storage medium 1510 to perform methods of the present disclosure. The software code includes, for example, instructions to gather data and documents and analyze documents. In an example, the data profiler 130, the data mapper 140, the record predictor 150 may be software codes or components performing these steps.

The instructions on the computer-readable storage medium 1510 are read and stored the instructions in storage 1515 or random access memory (RAM) 1520. The storage 1515 provides a large space for keeping static data where at least some instructions could be stored for later execution. The stored instructions may be further compiled to generate other representations of the instructions and dynamically stored in the RAM 1520. The processor 150 5 reads instructions from the RAM 1520 and performs actions as instructed.

The computer system 1500 further includes an output device 1525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1500 further includes input device 1530 to provide a user or another device with mechanisms for entering data and/or otherwise interact with the computer system 1500. The input device may include, for example, a keyboard, a keypad, a mouse, or a touchscreen. Each of these output devices 1525 and input devices 1530 could be joined by one or more additional peripherals. In an example, the output device 1525 may be used to display the results of the query.

A network communicator 1535 may be provided to connect the computer system 1500 to a network and in turn to other devices connected to the network including other clients, servers, data stores, and interfaces, for instance. A network communicator 1535 may include, for example, a network adapter such as a LAN adapter or a wireless adapter. The computer system 1500 includes a data source interface 1540 to access data source 1545. A data source is an information resource. As an example, a database of exceptions and rules may be a data source. Moreover, knowledge repositories and curated data may be other examples of data sources.

Figure 16A:
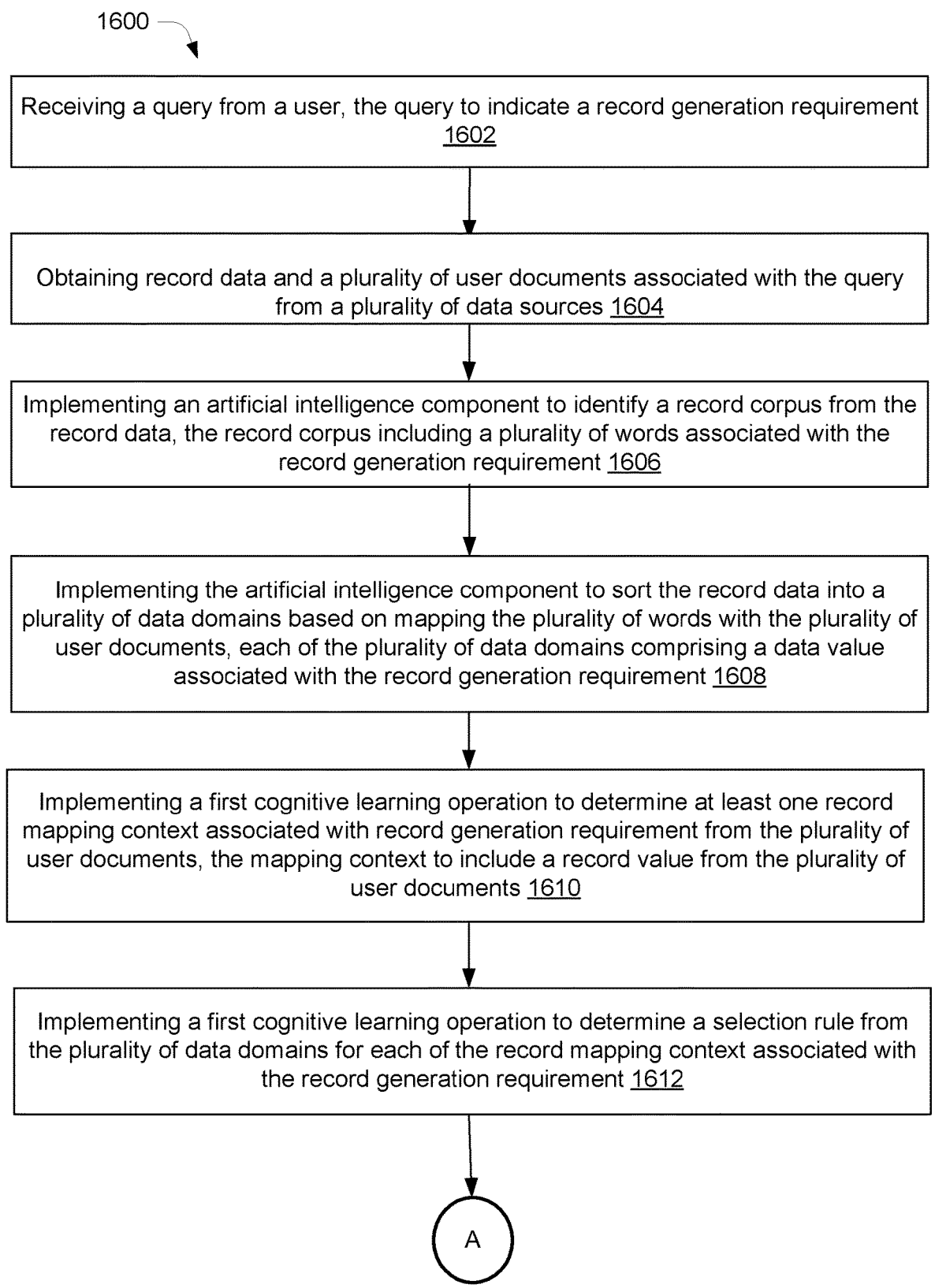
FIGS. 16A and 16B illustrate a process flowchart for record generation using a record generation system, according to an example embodiment of the present disclosure.
Figure 16B:
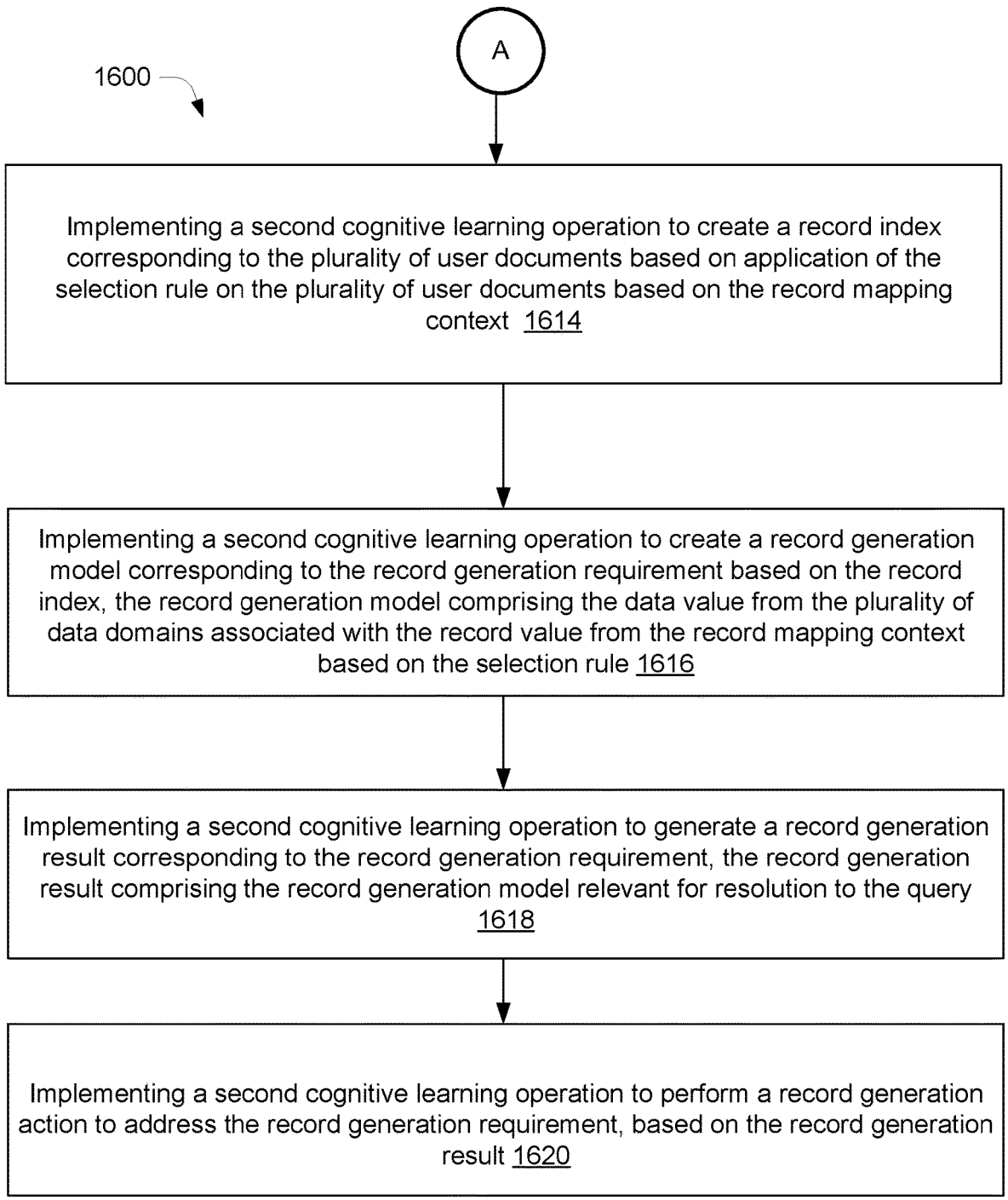

FIGS. 16A and 16B illustrate a process flowchart for record generation using the record generation system 110, according to an example embodiment of the present disclosure.

It should be understood that method steps are shown here for reference only and other combinations of the steps may be possible. Further, the method 1600 may contain some steps in addition to the steps shown in FIGS. 16A and 16B. For the sake of brevity, construction and operational features of the system 110 which are explained in detail in the description of FIGS. 1-15 are not explained in detail in the description of FIG. 16A and FIG. 16B. The method 1600 may be performed by a component of the system 110, such as the processor 120, the data profiler 130, the data mapper 140, and the record predictor 150.

At block 1602, a query may be obtained by a user. The query may indicate a record generation requirement 202.

At block 1604, record data 204 and a plurality of user documents associated with the query may be obtained from a plurality of data sources 206.

At block 1606, the artificial intelligence component 216 may be implemented to identify a record corpus 208 from the record data 204, the record corpus 208 including a plurality of words 210 associated with the record generation requirement 202.

At block 1608, the artificial intelligence component 216 may be implemented to sort the record data 204 into a plurality of data domains 212 based on mapping the plurality of words 210 with the plurality of user documents, each of the plurality of data domains 212 comprising a data value 214 associated with the record generation requirement 202.

At block 1610, the first cognitive learning operation 218 may be implemented to determine at least one record mapping context 220 associated with record generation requirement 202 from the plurality of user documents, the mapping context to include a record value 222 from the plurality of user documents.

At block 1612, the first cognitive learning operation 218 may be implemented to determine a selection rule 224 from the plurality of data domains 212 for each of the record mapping context 220 associated with the record generation requirement 202.

At block 1614, the second cognitive learning operation 228 may be implemented to create a record index 230 corresponding to the plurality of user documents based on application of the selection rule 224 on the plurality of user documents.

At block 1616, the second cognitive learning operation 228 may be implemented to create a record generation model 232 corresponding to the record generation requirement 202 based on the record index 230, the record generation model 232 comprising the data value 214 from the plurality of data domains 212 associated with the record value 222 from the record mapping context 220 based on the selection rule 224.

At block 1618, the second cognitive learning operation 228 may be implemented to generate a record generation result 234 corresponding to the record generation requirement 202, the record generation result 234 comprising the record generation model 232 relevant for the resolution to the query.

At block 1620, the second cognitive learning operation 228 may be implemented to perform a record generation action to address the record generation requirement 202, based on the record generation result 234.

In an example, the method 1600 may further comprise updating the record corpus 208 and the plurality of data domains 212, based on an update in the record data 204 or based on an update in the plurality of user documents. The method 1600 may further comprise creating the record generation model 232 as a knowledge tree 240 comprising the data values 214 from the plurality of data domains 212 distributed across the knowledge tree 240 based on the mapping context and the selection rule 224. The method 1600 may further comprise determining the record value 222 to include a plurality of word phrases 226 identified from the plurality of user documents and map the plurality of word phrases 226 with the record corpus 208 to determine the selection rule 224 from the plurality of data domains 212.

In accordance with various embodiments of the present disclosure, the method 1600 may include at least one numeral symbol 238 associated with the record generation requirement 202. The method 1600 may further comprise creating a record generation library 236 comprising the record index 230, the mapping context, and the selection rule 224 associated with the record generation requirement 202. The method 1600 may further comprise deploying the record generation library 236 for creating the record generation model 232.

In an example, the method 1600 may be practiced using a non-transitory computer-readable medium. In an example, the method 1600 may be computer-implemented.

The present disclosure provides for an intelligent invoice generation system that may generate invoice records for various products and services while incurring minimal costs and minimal human intervention. Furthermore, the present disclosure may categorically analyze various parameters that may have an impact on identifying billable and non-billable components, accurately estimating the billing amounts on billable components and services in a personalized manner for various clients of an organization.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
a data profiler coupled to the processor, the data profiler to:
receive a query associated with equipment from a user, the query to indicate a record generation requirement;
obtain, on a real-time basis, record data and a plurality of user documents associated with the query from a plurality of data sources; and
implement an artificial intelligence component to:
identify a record corpus from the record data, the record corpus including a plurality of words associated with the record generation requirement, wherein the record corpus is identified by detecting a fault in the equipment; and
sort the record data into a plurality of data domains based on mapping the plurality of words with the plurality of user documents through natural language processing techniques and data mining techniques, each of the plurality of data domains comprising a data value associated with the record generation requirement;
a data mapper coupled to the processor, the data mapper to implement a first cognitive learning operation to:
determine at least one record mapping context associated with record generation requirement from the plurality of user documents, the mapping context to include a record value from the plurality of user documents, wherein the record value comprises a plurality of words phrases identified from the plurality of user documents; and
determine a selection rule from the plurality of data domains for each of the record mapping context associated with the record generation requirement, wherein the selection rule indicates selection criteria for mining data for processing the record generation requirement from the plurality of data domains; and
a record predictor coupled to the processor, the record predictor to implement a second cognitive learning operation to:
create a record index corresponding to the plurality of user documents based on application of the selection rule on the plurality of user documents, wherein the record index indicates a set of products or services associated with the plurality of user documents;

validate the record index for the record generation requirement, wherein the validation is performed by comparing the record index with a set of record indices associated with previous record generation requirements stored in a record generation library;

create a record generation model corresponding to the record generation requirement based on the record index, the record generation model comprising the data value from the plurality of data domains associated with the record value from the record mapping context based on the selection rule;

generate a record generation result corresponding to the record generation requirement, the record generation result comprising the record generation model relevant for resolution to the query; and perform a record generation action to address the record generation requirement, based on the record generation result.

2. The system as claimed in claim 1, wherein the data profiler is to update the record corpus and the plurality of data domains, based on an update in the record data or based on an update in the plurality of user documents.

3. The system as claimed in claim 1, wherein the record predictor is to create the record generation model as a knowledge tree comprising the data values from the plurality of data domains distributed across the knowledge tree based on the mapping context and the selection rule.

4. The system as claimed in claim 1, wherein the data mapper is to:

map the plurality of word phrases with the record corpus to determine the selection rule from the plurality of data domains.

5. The system as claimed in claim 1, wherein the record generation result includes at least one numeral symbol associated with the record generation requirement.

6. The system as claimed in claim 1, wherein the record predictor is to create the record generation library comprising the record index, the mapping context, and the selection rule associated with the record generation requirement.

7. The system as claimed in claim 6, wherein the record predictor is to deploy the record generation library to create the record generation model.

8. A method comprising:

receiving, by a processor, a query associated with equipment from a user, the query to indicate a record generation requirement;

obtaining, by the processor, on a real-time basis, record data and a plurality of user documents associated with the query from a plurality of data sources;

implementing, by the processor, an artificial intelligence component to:

identify a record corpus from the record data, the record corpus including a plurality of words associated with the record generation requirement, wherein the record corpus is identified by detecting a fault in the equipment; and sort the record data into a plurality of data domains based on mapping the plurality of words with the plurality of user documents through natural language processing techniques and data mining techniques, each of the plurality of data domains comprising a data value associated with the record generation requirement;

implementing, by the processor, a first cognitive learning operation to:

determine at least one record mapping context associated with record generation requirement from the plurality of user documents, the mapping context to include a record value from the plurality of user documents, wherein the record value comprises a plurality of words phrases identified from the plurality of user documents; and determine a selection rule from the plurality of data domains for each of the record mapping context associated with the record generation requirement, wherein the selection rule indicates selection criteria for mining data for processing the record generation requirement from the plurality of data domains;

implementing, by the processor, a second cognitive learning operation to:

create a record index corresponding to the plurality of user documents based on application of the selection rule on the plurality of user documents based on the record mapping context, wherein the record index indicates a set of products or services associated with the plurality of user documents;

validate the record index for the record generation requirement, wherein the validation is performed by comparing the record index with a set of record indices associated with previous record generation requirements stored in a record generation library;

create a record generation model corresponding to the record generation requirement based on the record index, the record generation model comprising the data value from the plurality of data domains associated with the record value from the record mapping context based on the selection rule;

generate a record generation result corresponding to the record generation requirement, the record generation result comprising the record generation model relevant for resolution to the query; and perform a record generation action to address the record generation requirement, based on the record generation result.

9. The method as claimed in claim 8, wherein the method further comprise updating, by the processor, the record corpus, and the plurality of data domains based on an update in the record data and/or an update in the plurality of user documents.

10. The method as claimed in claim 8, wherein the method further comprise creating, by the processor, the record generation model as a knowledge tree comprising the data values from the plurality of data domains distributed across the knowledge tree based on the mapping context and the selection rule.

11. The method as claimed in claim 8, wherein the method further comprise mapping the plurality of word phrases with the record corpus to determine the selection rule the plurality of data domains.

12. The method as claimed in claim 8, wherein the method further comprise generating, by the processor, the record generation result to include at least one numeral symbol associated with the record generation requirement.

13. The method as claimed in claim 8, wherein the method further comprise creating, by the processor, the record generation library comprising the record index, the mapping context and the selection rule associated with the record generation requirement.

14. The method as claimed in claim 13, wherein the method further comprise deploying, by the processor, the record generation library to create the record generation model.

15. A non-transitory computer readable medium including machine readable instructions that are executable by a processor to:
> receive a query associated with equipment from a user, the query to indicate a record generation requirement;
> obtain, on a real-time basis, record data and a plurality of user documents associated with the query from a plurality of data sources;
> implement an artificial intelligence component to:
>> identify a record corpus from the record data, the record corpus including a plurality of words associated with the record generation requirement, wherein the record corpus is identified by detecting a fault in the equipment; and
>> sort the record data into a plurality of data domains based on mapping the plurality of words with the plurality of user documents through natural language processing techniques and data mining techniques, each of the plurality of data domains comprising a data value associated with the record generation requirement;
> implement a first cognitive learning operation to:
>> determine at least one record mapping context associated with record generation requirement from the plurality of user documents, the mapping context to include a record value from the plurality of user documents, wherein the record value comprises a plurality of words phrases identified from the plurality of user documents; and
>> determine a selection rule from the plurality of data domains for each of the record mapping context associated with the record generation requirement, wherein the selection rule indicates selection criteria for mining data for processing the record generation requirement from the plurality of data domains;
> implement the second cognitive learning operation to:
>> create a record index corresponding to the plurality of user documents based on application of the selection rule on the plurality of user documents based on the record mapping context, wherein the record index indicates a set of products or services associated with the plurality of user documents;
>> validate the record index for the record generation requirement, wherein the validation is performed by comparing the record index with a set of record indices associated with previous record generation requirements stored in a record generation library;
>> create a record generation model corresponding to the record generation requirement based on the record index, the record generation model comprising the data value from the plurality of data domains associated with the record value from the record mapping context based on the selection rule;
>> generate a record generation result corresponding to the record generation requirement, the record generation result comprising the record generation model relevant for resolution to the query; and
>> perform a record generation action to address the record generation requirement, based on the record generation result.

16. The non-transitory computer-readable medium of claim 15, wherein the processor is to update the record corpus, and the plurality of data domains based on an update in the record data and/or an update in the plurality of user documents.

17. The non-transitory computer-readable medium of claim 15, wherein the processor is to create the record generation model as a knowledge tree comprising the data values from the plurality of data domains distributed across the knowledge tree based on the mapping context and the selection rule.

18. The non-transitory computer-readable medium of claim 15, wherein the processor is to map the plurality of word phrases with the record corpus to determine the selection rule the plurality of data domains.

19. The non-transitory computer-readable medium of claim 15, wherein the processor is to generate the record generation result to include at least one numeral symbol associated with the record generation requirement.

20. The non-transitory computer-readable medium of claim 15, wherein the processor is to create the record generation library comprising the record index, the mapping context and the selection rule associated with the record generation requirement and deploy the record generation library to create the record generation model.

* * * * *